United States Patent
Mizuhashi et al.

(10) Patent No.: US 10,795,497 B2
(45) Date of Patent: Oct. 6, 2020

(54) DETECTION DEVICE DRIVEN WITH TWO DIFFERENT MODES

(71) Applicant: Japan Display Inc., Tokyo (JP)

(72) Inventors: Hiroshi Mizuhashi, Tokyo (JP); Tadayoshi Katsuta, Tokyo (JP); Yoshitoshi Kida, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/364,452

(22) Filed: Mar. 26, 2019

(65) Prior Publication Data

US 2019/0220140 A1 Jul. 18, 2019

Related U.S. Application Data

(63) Continuation of application No. 14/198,224, filed on Mar. 5, 2014, now Pat. No. 10,289,234.

(30) Foreign Application Priority Data

Mar. 29, 2013 (JP) ................... 2013-075087

(51) Int. Cl.
  *G06F 3/041* (2006.01)
  *G06F 3/044* (2006.01)

(52) U.S. Cl.
  CPC ............ *G06F 3/0416* (2013.01); *G06F 3/044* (2013.01); *G06F 3/0412* (2013.01)

(58) Field of Classification Search
  CPC ................................ G06F 3/0416; G06F 3/044
  See application file for complete search history.

(56) References Cited

U.S. PATENT DOCUMENTS

| | | | |
|---|---|---|---|
| 2011/0267293 A1 | 11/2011 | Noguchi et al. | |
| 2011/0267295 A1 | 11/2011 | Noguchi et al. | |
| 2012/0001859 A1* | 1/2012 | Kim ..................... | G06F 3/0418 345/173 |
| 2012/0050216 A1 | 3/2012 | Kremin et al. | |
| 2012/0075239 A1 | 3/2012 | Azumi et al. | |
| 2012/0262387 A1 | 10/2012 | Mizuhashi et al. | |
| 2013/0321382 A1 | 12/2013 | Nagao | |

FOREIGN PATENT DOCUMENTS

JP 2012-230657 11/2012

* cited by examiner

*Primary Examiner* — William Boddie
*Assistant Examiner* — Andrew B Schnirel
(74) *Attorney, Agent, or Firm* — Michael Best & Friedrich LLP

(57) ABSTRACT

According to an aspect, a display device with a touch detection function includes: a display region; a plurality of drive electrodes; a control device; a touch detection electrode that is opposed to the drive electrodes and forms capacitance with respect to the drive electrodes; power supply wiring arranged in a frame region positioned outside the display region; and a plurality of drive electrode scanning units that select the drive electrode to be coupled to the power supply wiring. When the drive electrode scanning unit simultaneously selects the drive electrodes of which number is equal to or larger than the number of pieces of the power supply wiring, the control device supplies a touch driving signal that is multiplexed based on a certain code to each of the selected drive electrodes.

8 Claims, 30 Drawing Sheets

FIG.24

| Bk | D4 | D3 | D2 | D1 | D0 |
|---|---|---|---|---|---|
| 0 | 0 | 0 | 0 | 0 | 0 |
| 1 | 0 | 0 | 0 | 0 | 1 |
| 2 | 0 | 0 | 0 | 1 | 0 |
| 3 | 0 | 0 | 0 | 1 | 1 |
| 4 | 0 | 0 | 1 | 0 | 0 |
| 5 | 0 | 0 | 1 | 0 | 1 |
| 6 | 0 | 0 | 1 | 1 | 0 |
| 7 | 0 | 0 | 1 | 1 | 1 |
| 8 | 0 | 1 | 0 | 0 | 0 |
| 9 | 0 | 1 | 0 | 0 | 1 |
| 10 | 0 | 1 | 0 | 1 | 0 |
| 11 | 0 | 1 | 0 | 1 | 1 |
| 12 | 0 | 1 | 1 | 0 | 0 |
| 13 | 0 | 1 | 1 | 0 | 1 |
| 14 | 0 | 1 | 1 | 1 | 0 |
| 15 | 0 | 1 | 1 | 1 | 1 |
| 16 | 1 | 0 | 0 | 0 | 0 |
| 17 | 1 | 0 | 0 | 0 | 1 |
| 18 | 1 | 0 | 0 | 1 | 0 |
| 19 | 1 | 0 | 0 | 1 | 1 |
| 20 | 1 | 0 | 1 | 0 | 0 |
| 21 | 1 | 0 | 1 | 0 | 1 |
| 22 | 1 | 0 | 1 | 1 | 0 |
| 23 | 1 | 0 | 1 | 1 | 1 |
| Invalid | 1 | 1 | 0 | 0 | 0 |
| Invalid | 1 | 1 | 0 | 0 | 1 |
| Invalid | 1 | 1 | 0 | 1 | 0 |
| Invalid | 1 | 1 | 0 | 1 | 1 |
| Invalid | 1 | 1 | 1 | 0 | 0 |
| Invalid | 1 | 1 | 1 | 0 | 1 |
| Invalid | 1 | 1 | 1 | 1 | 0 |
| Invalid | 1 | 1 | 1 | 1 | 1 |

FIG.30

| VCOMFL | Dec1 | Dec2 | SELCDM | |
|---|---|---|---|---|
| H | H | H | Don't Care | VCOMSEL |
| | | L | H | XVCOMSEL |
| | | | L | Floating |
| | L | Don't Care | Don't Care | Floating |
| L | L | L | Don't Care | VcomDCL |

DETECTION DEVICE DRIVEN WITH TWO DIFFERENT MODES

CROSS-REFERENCE TO RELATED APPLICATIONS

The present application is a Continuation of application Ser. No. 14/198,224, filed Mar. 5, 2014, which claims priority from Japanese Application No. 2013-075087, filed on Mar. 29, 2013, the contents of which are incorporated by reference herein in its entirety.

BACKGROUND

1. Technical Field

The present disclosure relates to a display device and an electronic apparatus that can detect an external proximity object, specifically, a display device with a touch detection function and an electronic apparatus that can detect the external proximity object approaching from the outside based on a change in capacitance.

2. Description of the Related Art

In recent years, a touch detection device that can detect an external proximity object, what is called a touch panel, has been attracting attention. The touch panel is used for a display device with a touch detection function in a manner mounted on or integrated with a display device such as a liquid crystal display device. In the display device with a touch detection function, various button images and the like are displayed on the display device, so that information can be input using the touch panel instead of a typical mechanical button. The display device with a touch detection function having such a touch panel does not require an input device such as a keyboard, a mouse, and a keypad. Accordingly, use of the display device with a touch detection function tends to expand in portable information devices such as cellular telephones as well as computers.

Examples of type of the touch detection include, but are not limited to, an optical type, a resistance type, a capacitive type, and the like. A capacitive touch detection device is used for portable devices and the like, has a relatively simple structure, and can achieve low power consumption. For example, Japanese Patent Application Laid-open Publication No. 2012-230657 (JP-A-2012-230657) describes a capacitive touch panel.

In recent years, regarding the display device with a touch detection function, high definition and enlargement of a display panel has been achieved. For example, in a case in which the display panel and a touch panel are operated in synchronization with each other, a ratio occupied by a writing period of a pixel signal is increased in one frame period with increasing number of horizontal lines, so that time for touch detection is reduced. Accordingly, in the touch panel, it is desired that the touch detection be performed in a short time while maintaining accuracy of touch detection, which is an original purpose.

JP-A-2012-230657 discloses a display panel with a touch detection function also having a function for selecting a plurality of drive electrode blocks at the same time. However, it is not considered that the detection accuracy can be increased and a frame can be narrowed while the drive electrode blocks are selected at the same time.

For the foregoing reasons, there is a need for a display device with a touch detection function and an electronic apparatus that can increase detection accuracy and narrow the frame even when the drive electrodes to which the driving signal is applied are selected at the same time.

SUMMARY

According to an aspect, a display device with a touch detection function includes: a display region in which a plurality of pixel electrodes are arranged in a matrix; a plurality of drive electrodes arranged opposed to the pixel electrodes; a display functional layer having an image display function for displaying an image in the display region; a control device that applies a display driving voltage between the pixel electrodes and the drive electrodes based on an image signal and performs image display control so that the image display function of the display functional layer is exhibited; a touch detection electrode that is opposed to the drive electrodes and forms capacitance with respect to the drive electrodes; a touch detection unit that detects a position of a proximity object based on a detection signal from the touch detection electrode; power supply wiring arranged in a frame region positioned outside the display region; and a plurality of drive electrode scanning units that select the drive electrode to be coupled to the power supply wiring based on a selection signal from the control device. When first number that is number of the drive electrodes simultaneously selected by the drive electrode scanning unit is equal to or larger than second number that is number of pieces of the power supply wiring, the control device supplies a touch driving signal of which phase is determined based on a certain code.

According to another aspect, an electronic apparatus includes the display device with a touch detection function.

BRIEF DESCRIPTION OF THE DRAWINGS

FIG. 24 is an explanatory diagram illustrating an example of a control signal of a drive electrode scanning unit according to the third embodiment;

FIG. 30 is an explanatory diagram for explaining input and output in the drive circuit of the display device with a touch detection function according to the third embodiment;

DETAILED DESCRIPTION

The following describes modes for implementing the present disclosure (embodiments) in detail with reference to drawings. The present disclosure is not limited by content of the embodiments described below. Components described below include a component that is easily conceivable by those skilled in the art and a substantially equivalent component. The components described below may be appropriately combined with each other. The description will be held in the following order.

1. Embodiments (display devices with a touch detection function)
   1-1. First embodiment
   1-2. Second embodiment
   1-3. Third embodiment
   1-4. Other modifications
2. Application example (electronic apparatus)
   Examples in which the display device with a touch detection function according to any one of the embodiments and the modifications thereof is applied to an electronic apparatus
3. Aspects of present disclosure 1. Embodiments (Display Devices with a Touch Detection Function)

1-1. First Embodiment

Example of Overall Structure

Figure 1:
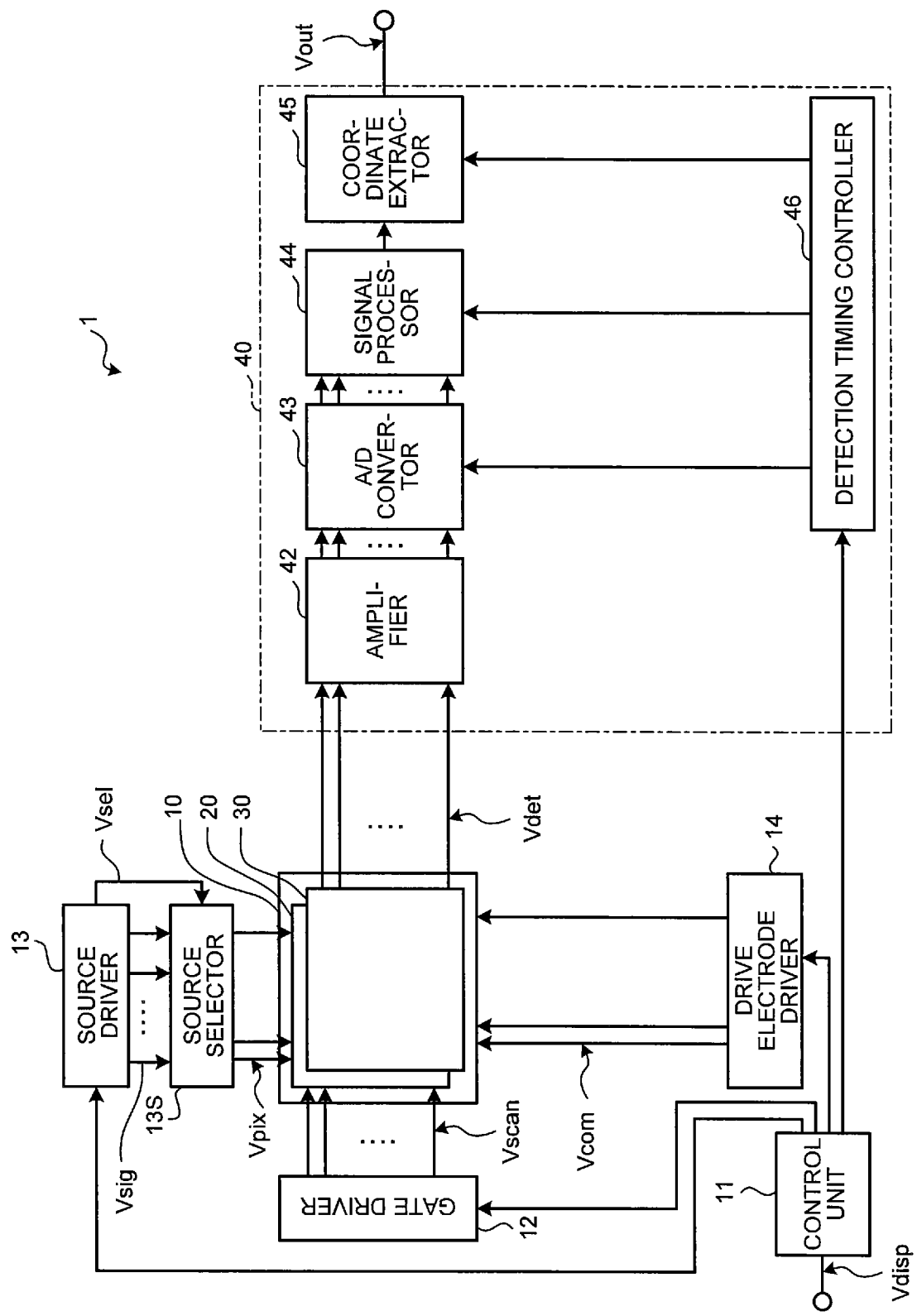
FIG. 1 is a block diagram illustrating a configuration example of a display device with a touch detection function according to a first embodiment.

FIG. 1 is a block diagram illustrating a configuration example of a display device with a touch detection function according to a first embodiment. A display device with a touch detection function 1 includes a display unit with a touch detection function 10, a control unit 11, a gate driver 12, a source driver 13, a source selector 13S, a drive electrode driver 14, and a touch detection unit 40. In the display device with a touch detection function 1, the display unit with a touch detection function 10 incorporates a touch detection function. The display unit with a touch detection function 10 is what is called an in-cell type device in which a liquid crystal display unit 20 including liquid crystal display elements as display elements is integrated with a capacitive touch detection device 30. The display unit with a touch detection function 10 may be what is called an on-cell type device in which the capacitive touch detection device 30 is mounted on the liquid crystal display unit 20 including the liquid crystal display elements as the display elements.

As described later, the liquid crystal display unit 20 is a device that performs display by sequentially scanning for each one horizontal line according to a scanning signal Vscan supplied from the gate driver 12. The control unit 11 is a circuit that supplies a control signal to each of the gate driver 12, the source driver 13, the drive electrode driver 14, and the touch detection unit 40 based on a display signal Vdisp supplied from the outside so that they operate in synchronization with each other. A control device in the present disclosure includes the control unit 11, the gate driver 12, the source driver 13, and the drive electrode driver 14.

The gate driver 12 has a function of sequentially selecting one horizontal line serving as a display driving target of the display unit with a touch detection function 10 based on the control signal supplied from the control unit 11.

The source driver 13 is a circuit for supplying a pixel signal Vpix to each pixel Pix (sub-pixel SPix) (described later) of the display unit with a touch detection function 10 based on the control signal supplied from the control unit 11. As will be described later, the source driver 13 generates a video signal Vsig obtained by multiplexing time-divisionally the pixel signals Vpix of the sub-pixels SPix of the liquid crystal display unit 20 from the video data for one horizontal line, and supplies the video signal Vsig to the source selector 13S. The source driver 13 also generates a selector switch control signal Vsel required for separating the pixel signal Vpix multiplexed into the video signal Vsig, and supplies the selector switch control signal Vsel to the source selector 13S together with the pixel signal Vpix. The source selector 13S can reduce the number of pieces of wiring between the source driver 13 and the source selector 13S.

The drive electrode driver 14 is a circuit that supplies a driving signal Vcom to a drive electrode COML (described later) of the display unit with a touch detection function 10, based on the control signal supplied from the control unit 11. In the following description, the driving signal Vcom serving as a driving signal for display may be described as a display driving voltage VcomDC, and the driving signal Vcom serving as a driving signal for touch detection may be described as a touch driving signal VcomAC.

The touch detection unit 40 is a circuit that detects whether or not the touch detection device 30 is touched (in the contact state described later) based on the control signal supplied from the control unit 11 and the touch detection signal Vdet supplied from the touch detection device 30 of the display unit with a touch detection function 10, and obtains coordinates thereof in a touch detection region when the device is touched. The touch detection unit 40 includes an amplifier (a touch detection signal amplification unit 42), an analog-digital (A/D) convertor 43, a signal processor 44, a coordinate extractor 45, and a detection timing controller 46.

The amplifier 42 amplifies the touch detection signal Vdet supplied from the touch detection device 30. The amplifier 42 may include a low-pass analog filter that removes a high frequency component (noise component) included in the touch detection signal Vdet, and extracts and outputs a touch component.

Basic Principle of Capacitive Touch Detection

Figure 2:
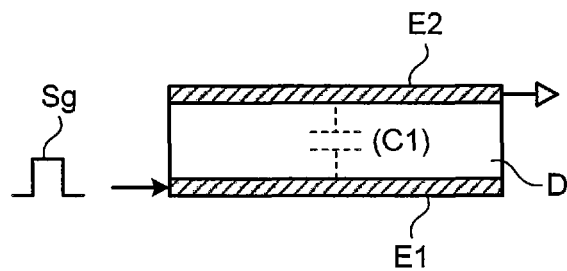
FIG. 2 is an explanatory diagram illustrating a state in which a finger is not in contact with or in proximity to the device, for explaining a basic principle of a capacitive touch detection method.
Figure 3:
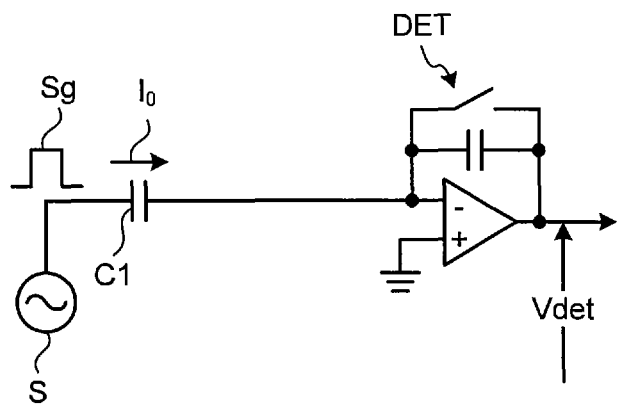
FIG. 3 is an explanatory diagram illustrating an example of an equivalent circuit in the state in which a finger is not in contact with or in proximity to the device as illustrated in FIG. 2.
Figure 4:
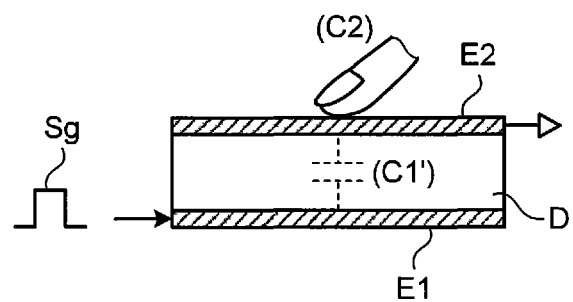
FIG. 4 is an explanatory diagram illustrating a state in which a finger is in contact with or in proximity to the device, for explaining the basic principle of the capacitive touch detection method.
Figure 5:
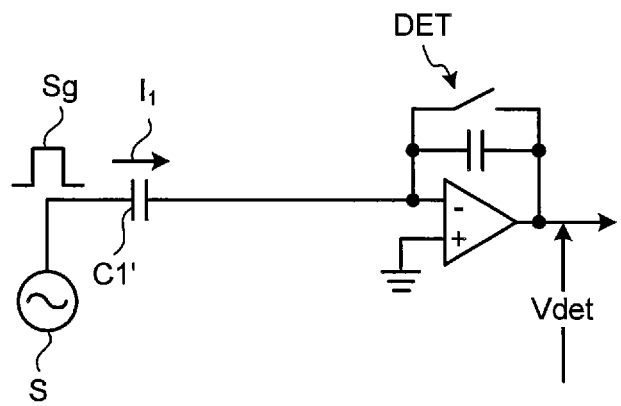
FIG. 5 is an explanatory diagram illustrating an example of the equivalent circuit in the state in which a finger is in contact with or in proximity to the device as illustrated in FIG. 4.
Figure 6:
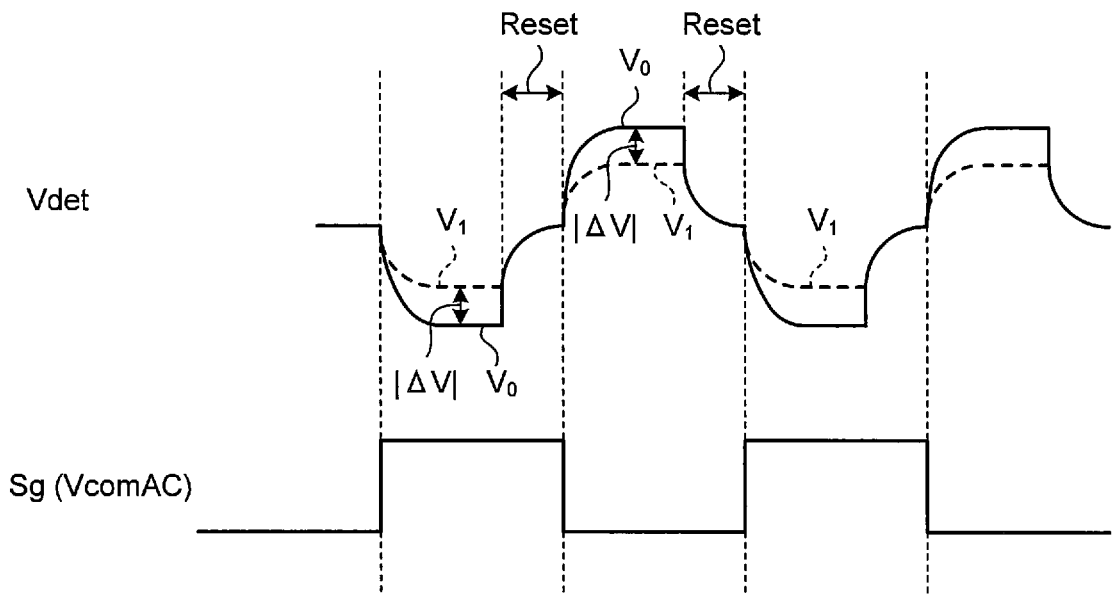
FIG. 6 is a diagram illustrating an example of waveforms of a driving signal and a touch detection signal.

The touch detection device 30 operates based on a basic principle of capacitive touch detection and outputs a touch detection signal Vdet. With reference to FIG. 1 to FIG. 6, the following describes the basic principle of touch detection in the display device with a touch detection function 1 according to the embodiment. FIG. 2 is an explanatory diagram illustrating a state in which a finger is not in contact with or in proximity to the device, for explaining the basic principle of the capacitive touch detection. FIG. 3 is an explanatory diagram illustrating an example of an equivalent circuit in the state in which a finger is not in contact with or in proximity to the device as illustrated in FIG. 2. FIG. 4 is an explanatory diagram illustrating a state in which a finger is in contact with or in proximity to the device, for explaining the basic principle of the capacitive touch detection method. FIG. 5 is an explanatory diagram illustrating an example of the equivalent circuit in the state in which a finger is in contact with or in proximity to the device as illustrated in FIG. 4. FIG. 6 is a diagram illustrating an example of waveforms of the driving signal and the touch detection signal.

For example, as illustrated in FIG. 2, a capacitive element C1 includes a pair of electrodes, that is, a drive electrode E1 and a touch detection electrode E2 that are arranged in a manner opposed to each other sandwiching a dielectric substance D. As illustrated in FIG. 3, the capacitive element C1 is coupled to an alternate current (AC) signal source (driving signal source) S at its one end and coupled to a voltage detector (touch detection unit) DET at its other end. For example, the voltage detector DET is an integrating circuit included in the amplifier 42 illustrated in FIG. 1.

When an AC rectangular wave Sg having a predetermined frequency (for example, about several kilohertz to several hundred kilohertz) is applied to the drive electrode E1 (one end of the capacitive element C1) from the AC signal source S, an output waveform (touch detection signal Vdet) appears via the voltage detector DET coupled to the touch detection electrode E2 (the other end of the capacitive element C1). The AC rectangular wave Sg corresponds to a driving signal VcomAC.

As illustrated in FIG. 2 and FIG. 3, in the state in which a finger is not in contact with (or in proximity to) the device (non-contact state), an electric current $I_0$ corresponding to a capacitance value of the capacitive element C1 flows according to charge and discharge with respect to the capacitive element C1. The voltage detector DET illustrated in FIG. 5 converts a variation in the electric current $I_0$ corresponding to the AC rectangular wave Sg to a variation in a voltage (waveform $V_0$ illustrated by a solid line).

As illustrated in FIG. 4, in the state in which a finger is in contact with (or in proximity to) the device (contact state), capacitance C2 formed by the finger is in contact with or in proximity to the touch detection electrode E2. Accordingly, capacitance corresponding to a fringe between the drive electrode E1 and the touch detection electrode E2 is blocked and the capacitive element C1 functions as a capacitive element C1' of which capacitance value is smaller. According to an equivalent circuit illustrated in FIG. 5, an electric current $I_1$ flows through the capacitive element C1'. As illustrated in FIG. 6, the voltage detector DET converts a variation in the electric current $I_1$ corresponding to the AC rectangular wave Sg to a variation in the voltage (waveform $V_1$ illustrated by a dotted line). In this case, amplitude of the waveform $V_1$ is smaller than that of the waveform $V_0$ described above. Accordingly, an absolute value |ΔV| corresponding to a voltage difference between the waveform $V_0$ and the waveform $V_1$ is changed in accordance with influence of an object, such as a finger, approaching from the outside. To accurately detect the absolute value |ΔV| corresponding to the voltage difference between the waveform $V_0$ and the waveform $V_1$, the voltage detector DET is preferably configured to operate with a period Reset in which charge and discharge of a capacitor are reset corresponding to a frequency of the AC rectangular wave Sg by switching in the circuit.

The touch detection device 30 illustrated in FIG. 1 performs touch detection by sequentially scanning for each detection block according to the driving signal Vcom (driving signal VcomAC) supplied from the drive electrode driver 14.

The touch detection device 30 is configured to output the touch detection signals Vdet for each detection block from a plurality of touch detection electrodes TDL (described later) via the voltage detector DET illustrated in FIG. 3 or FIG. 5, and supply the touch detection signals Vdet to the analog-digital (A/D) convertor 43 of the touch detection unit 40.

The A/D convertor 43 is a circuit that samples each analog signal output from the amplifier 42 and converts the analog signal to a digital signal at a timing synchronized with the driving signal VcomAC.

A signal processor 44 includes a digital filter that reduces frequency components (noise components), other than the frequency at which the driving signal Vcom is sampled, included in the output signal from the A/D convertor 43. The signal processor 44 is a logic circuit that detects whether or not the touch detection device 30 is touched based on the output signal from the A/D convertor 43. The signal processor 44 performs processing of taking out only a difference voltage caused by a finger. The difference voltage caused by the finger is the absolute value |ΔV| of a difference between the waveform $V_0$ and the waveform $V_1$ described above. The signal processor 44 may perform an operation of averaging the absolute value |ΔV| per detection block to obtain a mean value of the absolute value |ΔV|. Accordingly, the signal processor 44 can reduce influence by noise. The signal processor 44 compares the detected difference voltage caused by a finger with a predetermined threshold voltage. If the difference voltage is equal to or larger than the threshold voltage, it is determined that an external proximity object approaching from the outside is in the contact state, and if the difference voltage is less than the threshold voltage, it is determined that the external proximity object is in the non-contact state. In this way, the touch detection unit 40 can perform touch detection.

A coordinate extractor 45 is a logic circuit that obtains touch panel coordinates when touch is detected by the signal processor 44. A detection timing controller 46 controls the A/D convertor 43, the signal processor 44, and the coordinate extractor 45 to be operated in synchronization with one another. The coordinate extractor 45 outputs the touch panel coordinates as a signal output Vout.

Module

Figure 7:
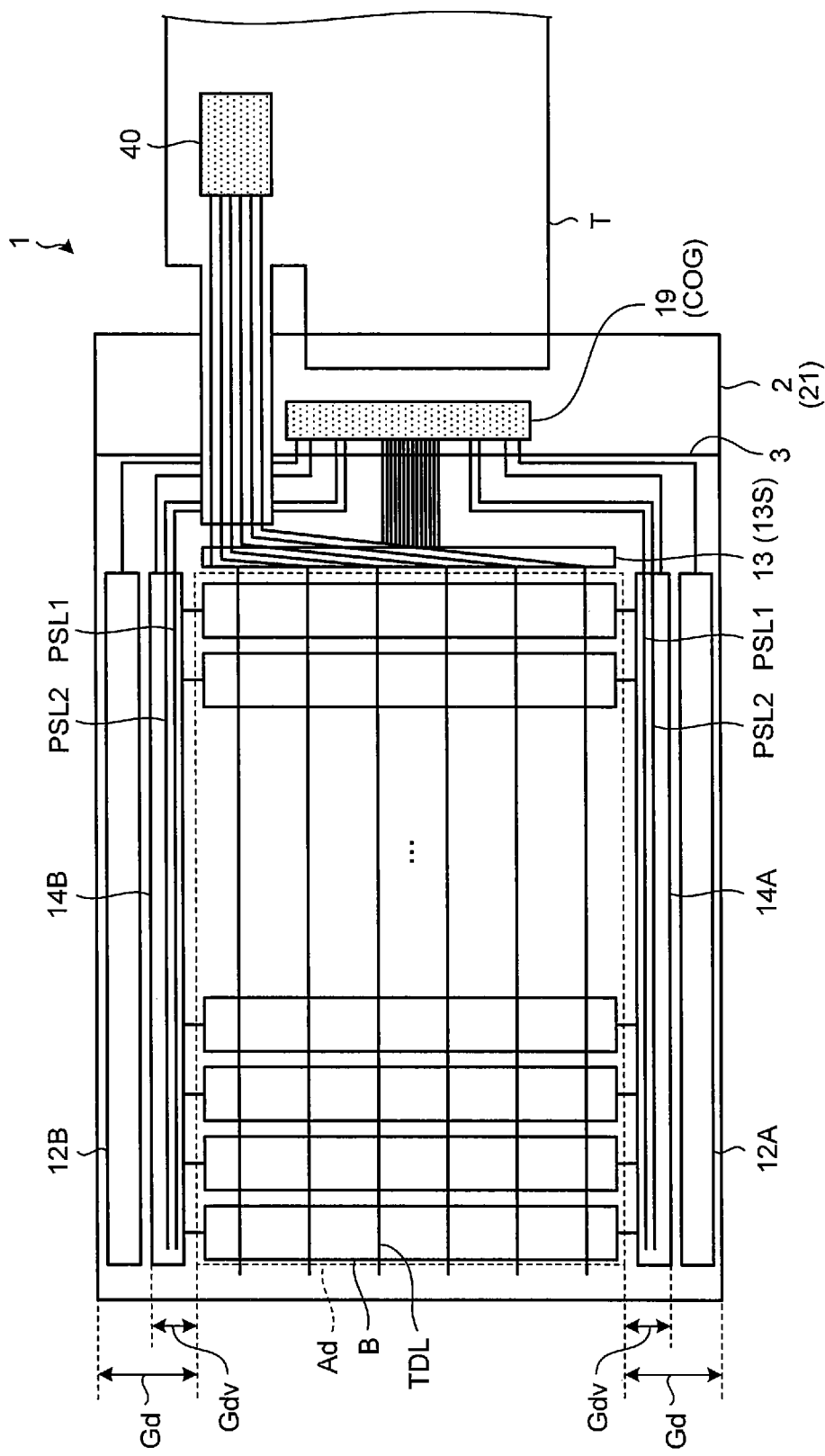
FIG. 7 is a diagram illustrating an example of a module to which the display device with a touch detection function according to the first embodiment is mounted.

FIG. 7 is a diagram illustrating an example of a module to which the display device with a touch detection function according to the first embodiment is mounted. As illustrated in FIG. 7, the display device with a touch detection function 1 includes a pixel substrate 2 (thin film transistor (TFT) substrate 21) and a flexible printed board T. The pixel substrate 2 (TFT substrate 21) is equipped with a chip on glass (COG) 19, and has a display region Ad and a frame Gd. The COG 19 is a chip of an IC driver mounted on the TFT substrate 21, and is a control device incorporating respective circuits required for display operation such as the control unit 11 and the source driver 13 illustrated in FIG. 1. In the present embodiment, the source driver 13 and the source selector 13S are formed over the TFT substrate 21. The source driver 13 and the source selector 13S may be incorporated in the COG 19. Drive electrode scanning units 14A and 14B, which are part of the drive electrode driver 14, are formed over the TFT substrate 21. The gate driver 12 is formed over the TFT substrate 21 as gate drivers 12A and 12B. In the display device with a touch detection function 1, the COG 19 may incorporate the circuits such as the drive electrode scanning units 14A and 14B and the gate driver 12.

As illustrated in FIG. 7, the touch detection electrodes TDL are formed to three-dimensionally intersect the drive electrode blocks B (drive electrodes COML) in a direction vertical to a surface of the TFT substrate 21.

The drive electrodes COML has a shape divided into a plurality of stripe electrode patterns extending in one direction. When the touch detection operation is performed, the driving signal VcomAC is sequentially supplied to each of the electrode patterns by the drive electrode driver 14. The stripe electrode patterns of the drive electrodes COML to which the driving signal VcomAC is supplied at the same time is the drive electrode block B illustrated in FIG. 7. The drive electrode blocks B are arranged in a long side direction of the display unit with a touch detection function 10, and the touch detection electrodes TDL are arranged in a short side direction of the display unit with a touch detection function 10. An output of each touch detection electrode TDL is provided at an end portion on a short side of the display unit with a touch detection function 10 and coupled to the touch detection unit 40 mounted to the flexible printed board T via the flexible printed board T. In this way, the touch detection unit 40 is mounted on the flexible printed board T, and is coupled to each of the touch detection electrodes TDL that arranged in parallel with each other. The flexible printed board T can be any terminal and is not limited to the flexible printed board. In this case, the touch detection unit 40 is provided to the outside of the module.

The driving signal generation unit described later is incorporated in the COG 19. The source selector 13S is formed in the vicinity of the display region Ad over the TFT substrate 21 by using the TFT elements. A large number of pixels Pix are arranged in a matrix in the display region Ad. The frames Gd, Gd are regions in which the pixel Pix is not arranged when the surface of the TFT substrate 21 is viewed from a direction vertical thereto. The gate driver 12 and the drive electrode scanning units 14A and 14B of the drive driver 14 are arranged in the frames Gd, Gd.

The gate driver 12 includes gate drivers 12A and 12B, and is formed over the TFT substrate 21 by using the TFT elements. The gate drivers 12A and 12B can perform drive operation at both sides of the display region Ad in which the sub-pixels SPix (pixels Pix) are arranged in a matrix. In the following description, the gate driver 12A may be called a first gate driver 12A and the gate driver 12B may be called a second gate driver 12B. Scanning lines GCL (see FIG. 9) are arranged between the first gate driver 12A and the second gate driver 12B. Accordingly, the scanning lines GCL are arranged to extend in a direction parallel with the extending direction of the drive electrodes COML when viewed from a direction vertical to the surface of the TFT substrate 21.

The drive electrode scanning units 14A and 14B are formed over the TFT substrate 21 by using the TFT elements. The drive electrode scanning units 14A and 14B are supplied with the display driving voltage VcomDC from the driving signal generation unit via first power supply wiring PSL1, and supplied with the driving signal VcomAC via second power supply wiring PSL2. Each of the drive electrode scanning units 14A and 14B occupies a certain width Gdv in the frame Gd. The drive electrode scanning units 14A and 14B can drive each of the drive electrode blocks B arranged in parallel from both sides thereof. The first power supply wiring PSL1 that supplies the display driving voltage VcomDC and the second power supply wiring PSL2 that supplies the touch driving signal VcomAC are arranged in parallel in the frames Gd, Gd. The first power supply wiring PSL1 is arranged to be closer to the display region Ad side as compared to the second power supply wiring PSL2. With this structure, the display driving voltage VcomDC supplied through the first power supply wiring PSL1 stabilizes an electric potential state at an end of the display region Ad. Accordingly, display is stabilized specifically in a liquid crystal display unit containing liquid crystals in a horizontal electric field mode.

The display device with a touch detection function 1 illustrated in FIG. 7 outputs the touch detection signals Vdet from the short side of the display unit with a touch detection function 10. Accordingly, in the display device with a touch detection function 1, routing of wiring is facilitated when the display device with a touch detection function 1 is coupled to the touch detection unit 40 via the flexible printed board T as a terminal part.

Display Unit with Touch Detection Function

Figure 8:
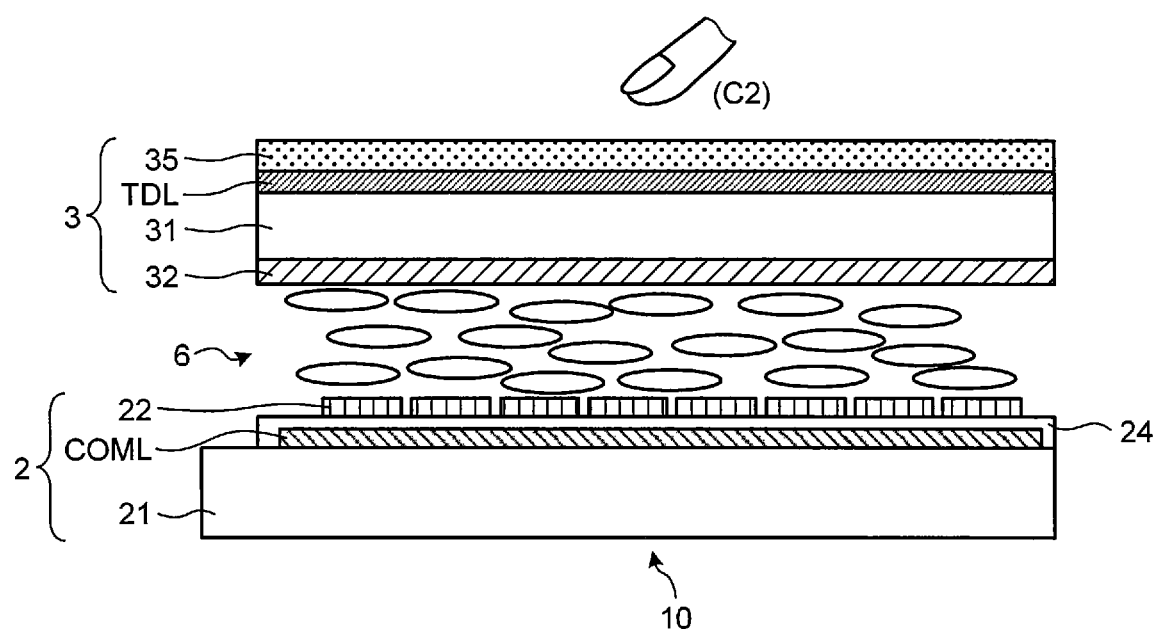
FIG. 8 is a cross-sectional view illustrating a schematic cross-sectional structure of a display unit with a touch detection function according to the first embodiment.
Figure 9:
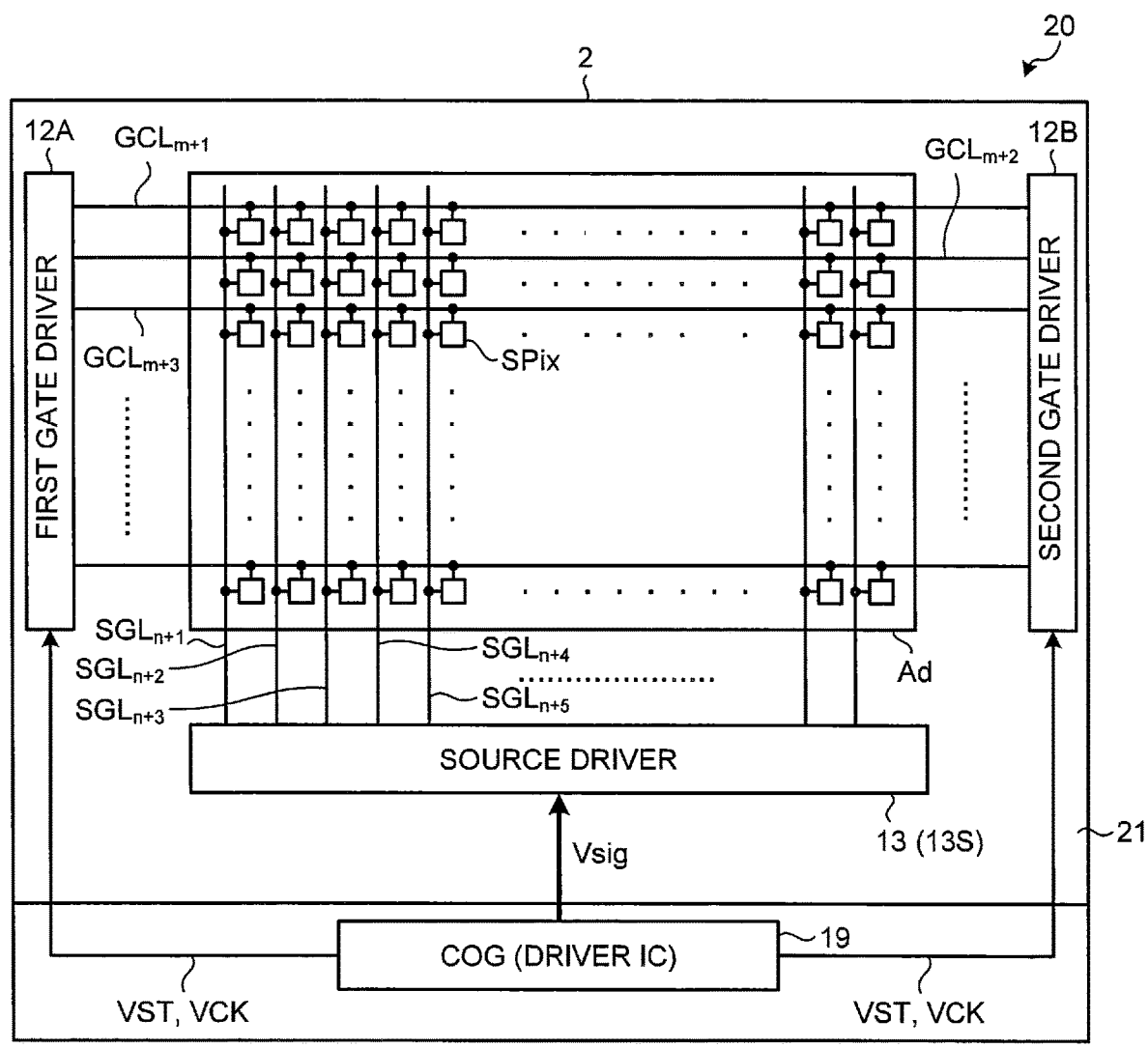
FIG. 9 is a diagram illustrating an example of a control device of the display device with a touch detection function according to the first embodiment.
Figure 10:
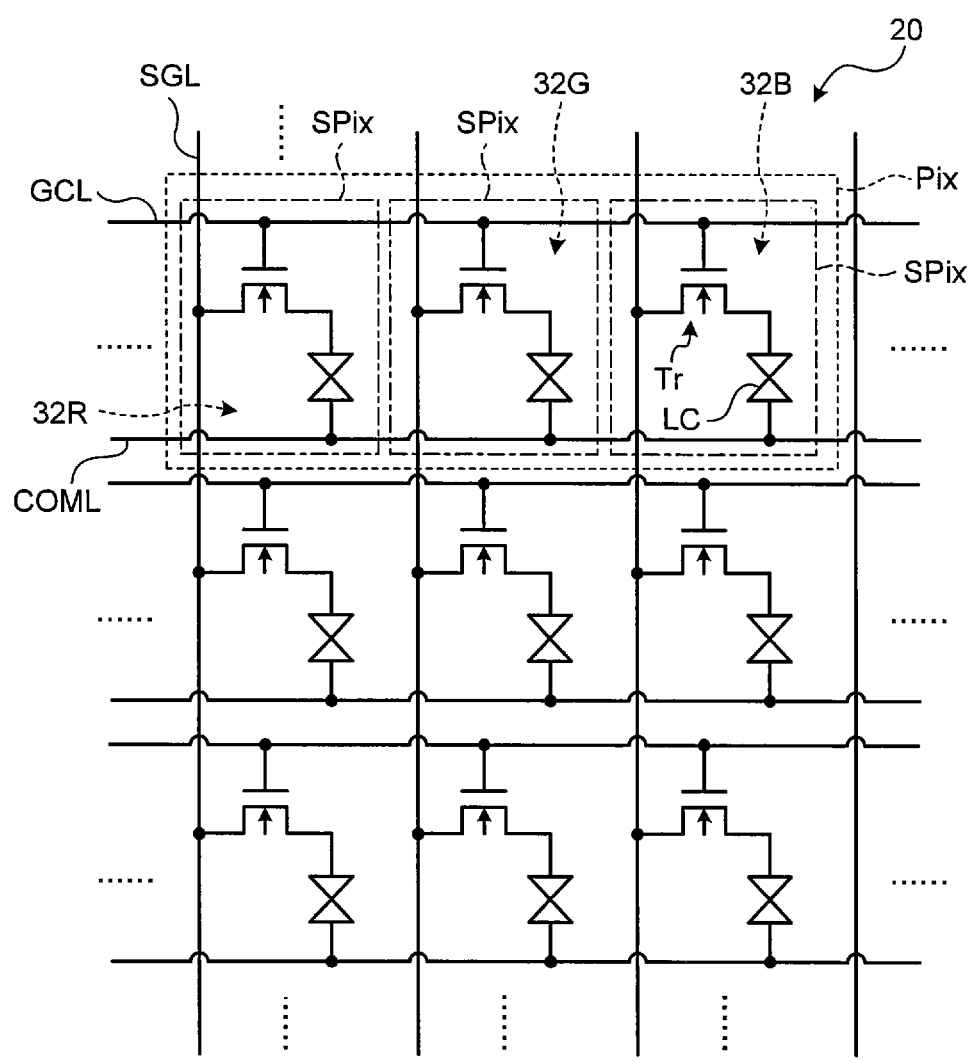
FIG. 10 is a circuit diagram illustrating a pixel array of the display unit with a touch detection function according to the first embodiment.

The following describes a configuration example of the display unit with a touch detection function 10 in detail. FIG. 8 is a cross-sectional view illustrating a schematic cross-sectional structure of the display unit with a touch detection function according to the first embodiment. FIG. 9 is a diagram illustrating an example of the control device of the display device with a touch detection function according to the first embodiment. FIG. 10 is a circuit diagram illustrating a pixel array of the display unit with a touch detection function according to the first embodiment.

As illustrated in FIG. 8, the display unit with a touch detection function 10 includes a pixel substrate 2, a counter substrate 3 arranged in a manner opposed to the pixel substrate 2 in a direction orthogonal to a surface of the pixel substrate 2, and a liquid crystal layer 6 interposed between the pixel substrate 2 and the counter substrate 3.

The liquid crystal layer 6 modulates light passing therethrough in accordance with a state of an electric field. The liquid crystal layer 6 is driven with, for example, a horizontal electric field mode such as the fringe field switching (FFS) mode or the in-plane switching (IPS) mode. Orientation films may be arranged between the liquid crystal layer 6 and the pixel substrate 2, and between the liquid crystal layer 6 and the counter substrate 3 illustrated in FIG. 8, respectively.

The counter substrate 3 includes a glass substrate 31 and a color filter 32 formed on one surface of the glass substrate 31. The touch detection electrodes TDL that are detection electrodes of the touch detection device 30 are formed on the other surface of the glass substrate 31, and a polarizing plate 35 is arranged on the touch detection electrodes TDL.

The pixel substrate 2 includes the TFT substrate 21 serving as a circuit board, a plurality of pixel electrodes 22 arranged in a matrix over the TFT substrate 21, the drive electrodes COML formed between the TFT substrate 21 and the pixel electrodes 22, and an insulating layer 24 that insulates the pixel electrodes 22 from the drive electrodes COML.

The pixel substrate 2 includes the TFT substrate 21 which is a transparent insulating substrate (for example, a glass substrate), the display region Ad in which a large number of pixels including a liquid crystal cell are arranged in a matrix, the COG 19 including a function as an interface (I/F) and a timing generator, the first gate driver 12A, the second gate driver 12B, and the source driver (horizontal drive circuit) 13. The flexible printed board T illustrated in FIG. 7 transmits an external signal to the COG 19, and transmits driving power that drives the COG 19. The gate drivers (vertical drive circuits) 12A and 12B are arranged as the first gate driver 12A and the second gate driver 12B with the display region Ad interposed therebetween.

The display region Ad has a matrix structure in which the sub-pixels SPix including the liquid crystal cell are arranged in M rows by N columns. In this specification, the row means a pixel row having N sub-pixels SPix arranged in one direction. The column means a pixel column having M sub-pixels SPix arranged in a direction orthogonal to the direction in which the sub-pixels SPix included in the row are arranged. Values of M and N are determined corresponding to display resolution in a vertical direction and display resolution in the horizontal direction. In the display region Ad, scanning lines $GCL_{m+1}$, $GCL_{m+2}$, $GCL_{m+3}$ . . . are wired for each row, and signal lines $SGL_{n+1}$, $SGL_{n+2}$, $SGL_{n+3}$, $SGL_{n+4}$, $SGL_{n+5}$ . . . are wired for each column, with respect to the arrangement of sub-pixels SPix in M rows by N columns. In the embodiment, the scanning lines $GCL_{m+1}$, $GCL_{m+2}$, $GCL_{m+3}$ . . . may be collectively referred to as the scanning line GCL, and the signal lines $SGL_{n+1}$, $SGL_{n+2}$, $SGL_{n+3}$, $SGL_{n+4}$, $SGL_{n+5}$ . . . may be collectively referred to as the signal line SGL.

A master clock, a horizontal synchronizing signal, and a vertical synchronizing signal serving as external signals are externally input to the pixel substrate 2 and supplied to the COG 19. The COG 19 level-converts (boosts) the master clock, the horizontal synchronizing signal, and the vertical synchronizing signal having voltage amplitude of an external power supply into voltage amplitude of internal power supply required for driving a liquid crystal, and passes them through the timing generator as the master clock, the horizontal synchronizing signal, and the vertical synchronizing signal to generate a vertical start pulse VST and a vertical clock pulse VCK. The COG 19 supplies the vertical start pulse VST and the vertical clock pulse VCK to the first gate driver 12A and the second gate driver 12B. The COG 19 generates the display driving voltage VcomDC that is supplied in common to the pixel electrodes provided respectively to the sub-pixels SPix and referred to as a common potential, and supplies the display driving voltage VcomDC to the drive electrode COML.

The first gate driver 12A and the second gate driver 12B include a shift register, and also may include a latch circuit and the like. The vertical start pulse VST is supplied to the first gate driver 12A and the second gate driver 12B, so that the latch circuit is synchronized with the vertical clock pulse VCK. The first gate driver 12A and the second gate driver 12B sequentially output a piece of digital data for one line latched by the latch circuit as a vertical scanning pulse to be supplied to the scanning lines GCL to sequentially select the sub-pixels SPix row by row. The first gate driver 12A and the second gate driver 12B are arranged in the extending direction of the scanning lines GCL with the scanning lines GCL interposed therebetween. The first gate driver 12A and the second gate driver 12B sequentially output the data from an upper direction of vertical scanning that is close to an upper part of the display region Ad to a lower direction of vertical scanning that is close to a lower part of the display region Ad.

Video data of R (red), G (green), and B (blue) of 6 bits are supplied to the source driver 13, for example. The source driver 13 and the source selector 13S write the display data via the signal lines SGL to the sub-pixels SPix included in a row selected by the vertical scanning by the first gate driver 12A and the second gate driver 12B for each pixel, for a plurality of pixels, or for all of the pixels at the same time.

Over the TFT substrate 21, formed are thin film transistor (TFT) elements Tr of provided respectively to the sub-pixels SPix illustrated in FIG. 9 and FIG. 10, and wiring including signal lines SGL that supply pixel signals Vpix to the pixel electrodes 22 illustrated in FIG. 8, scanning lines GCL that drive the TFT elements Tr, and the like. In this way, each of the signal lines SGL extends on a plane parallel to the surface of the TFT substrate 21 and supplies a pixel signal Vpix for displaying an image to a pixel. As illustrated in FIG. 10, the liquid crystal display unit 20 includes a plurality of sub-pixels SPix arranged in a matrix. Each of the sub-pixels SPix includes the TFT element Tr and the liquid crystal element LC. The TFT element Tr is constituted of the thin film transistor. In this example, the TFT element Tr is configured by an re-channel metal oxide semiconductor (MOS) type TFT. A source of the TFT element Tr is coupled to one of the signal lines SGL, a gate thereof is coupled to one of the scanning lines GCL, and a drain thereof is coupled to one end of the liquid crystal element LC. One end of the liquid crystal element LC is coupled to the drain of the TFT element Tr, and the other end thereof is coupled to one of the drive electrodes COML.

The first gate driver 12A and the second gate driver 12B illustrated in FIG. 9 apply the vertical scanning pulse via the scanning lines GCL illustrated in FIG. 10 to a gate of a TFT element Tr of the sub-pixels SPix to sequentially select one line (one horizontal line) of the sub-pixels SPix formed in a matrix in the display region Ad as a display driving target.

The source driver 13 supplies the pixel signals Vpix via the signal lines SGL to the sub-pixel SPix included in one horizontal line that is sequentially selected by the first gate driver 12A and the second gate driver 12B. In these sub-pixels SPix, display for one horizontal line is performed corresponding to the supplied pixel signals Vpix. The drive electrode driver 14 drives the drive electrode COML by applying the display driving signal (display driving voltage VcomDC).

As described above, in the display device with a touch detection function 1, the first gate driver 12A and the second gate driver 12B perform drive operation to sequentially scan the scanning lines $GCL_{m+1}$, $GCL_{m+2}$, and $GCL_{m+3}$, so that each horizontal line is sequentially selected. In the display device with a touch detection function 1, the source driver 13 supplies the pixel signal Vpix to each pixel Pix belonging to one horizontal line, so that display is performed for each horizontal line. When the display operation is performed, the drive electrode driver 14 applies the driving signal Vcom to the drive electrode COML corresponding to the horizontal line.

In the color filter 32 illustrated in FIG. 8, for example, color regions of the color filter colored in red (R), green (G), and blue (B) are periodically arranged, and color regions 32R, 32G, and 32B (refer to FIG. 10) of three colors R, G, and B are associated with the sub-pixels SPix illustrated in FIG. 10 as a set serving as the pixel Pix. The color filter 32 is opposed to the liquid crystal layer 6 in a direction vertical to the TFT substrate 21. The color filter 32 may include other combination of colors as long as they are different colors.

Each of the sub-pixels SPix illustrated in FIG. 10 is coupled to the other sub-pixels SPix belonging to the same row of the liquid crystal display unit 20 by one of the scanning lines GCL. The scanning lines GCL are coupled to the gate driver 12 and supplied with the scanning signal Vscan from the gate driver 12. Each of the sub-pixels SPix is coupled to the other sub-pixels SPix belonging to the same column of the liquid crystal display unit 20 by one of the signal lines SGL. The signal lines SGL are coupled to the source driver 13 and supplied with the pixel signals Vpix from the source driver 13.

Figure 11:
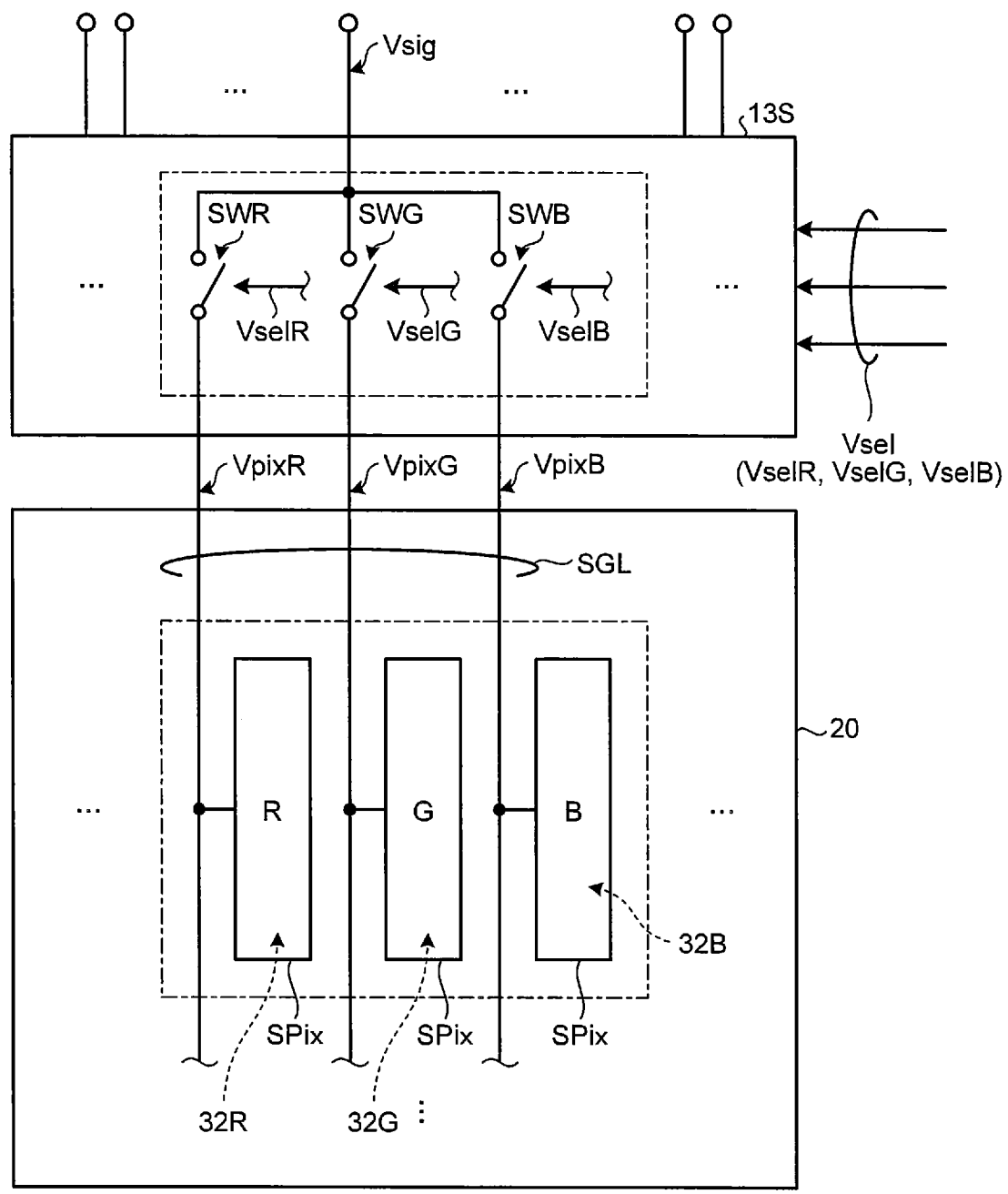
FIG. 11 is a schematic diagram illustrating a relation between a source driver and signal lines in the module to which the display device with a touch detection function according to the first embodiment is mounted.

FIG. 11 is a schematic diagram illustrating a relation between the source driver and the signal lines in the module to which the display device with a touch detection function according to the first embodiment is mounted. As illustrated in FIG. 11, in the display device with a touch detection function 1, each signal line SGL is coupled to the source driver 13 incorporated in the above-described COG 19 via the source selector 13S. The source selector 13S performs opening and closing operation in accordance with to the selector switch control signal Vsel.

As illustrated in FIG. 11, the source driver 13 generates and outputs the video signal Vsig based on a source driver control signal and the video data supplied from the control unit 11. The source driver 13 generates the video signal Vsig into which the pixel signals Vpix (VpixR, VpixG, and VpixB) to be supplied to a plurality of (in this example, three) sub-pixels SPix are multiplexed, from the video data for one horizontal line, and supplies the video signal Vsig to the source selector 13S. The source driver 13 also generates the selector switch control signals Vsel (VselR, VselG, and VselB) required for separating each of the pixel signals VpixR, VpixG, and VpixB from the video signal Vsig into which the pixel signals VpixR, VpixG, and VpixB are multiplexed, and supplies the selector switch control signals Vsel (VselR, VselG, and VselB) to the source selector 13S along with the video signal Vsig. As described above, with this multiplexing configuration, the number of pieces of wiring is reduced between the source driver 13 and the source selector 13S.

The source selector 13S separates the pixel signals Vpix from the time-divisionally multiplexed video signal Vsig based on the video signals Vsig serving as display data supplied from the source driver 13 and the selector switch control signal Vsel, and supplies the pixel signals Vpix to the liquid crystal display unit 20 of the display device with a touch detection function 1. The source selector 13S, for example, includes three switches SWR, SWG, and SWB. Ends of the three switches SWR, SWG, and SWB are coupled to each other and supplied with the video signal Vsig from the source driver 13. The other ends of the three switches SWR, SWG, and SWB are coupled to the sub-pixels SPix via the signal lines SGL of the liquid crystal display unit 20, respectively.

The control unit 11 supplies a signal for display to the source driver 13. Based on this signal, the source driver 13 generates the selector switch control signals Vsel (VselR, VselG, and VselB). The three switches SWR, SWG, and SWB are opened and closed corresponding to the selector switch control signals Vsel (VselR, VselG, and VselB, respectively) supplied from the source driver 13. With such a structure, the source selector 13S can sequentially switch the switches SWR, SWG, and SWB in a time division manner to be in an ON state corresponding to the selector switch control signal Vsel. With such an operation, the source selector 13S separates the pixel signals Vpix (VpixR, VpixG, and VpixB) serving as display data from the multiplexed video signal Vsig serving as display data. The source selector 13S supplies the pixel signals Vpix to the three sub-pixels SPix, respectively.

The above-described color regions 32R, 32G, and 32B colored in red (R), green (G), and blue (B) are associated with the sub-pixels SPix, respectively. Accordingly, the pixel signal VpixR is supplied to the sub-pixel SPix corresponding to the color region 32R. The pixel signal VpixG is supplied to the sub-pixel SPix corresponding to the color region 32G. The pixel signal VpixB is supplied to the sub-pixel SPix corresponding to the color region 32B.

Each of the sub-pixels SPix is further coupled to the other sub-pixels SPix belonging to the same row of the liquid crystal display unit 20 by one of the drive electrodes COML. The drive electrodes COML are coupled to the drive electrode driver 14 and supplied with the display driving voltage VcomDC from the drive electrode driver 14. That is, in this example, the sub-pixels SPix belonging to the same row share the drive electrode COML.

The gate driver 12 illustrated in FIG. 1 applies the scanning signal Vscan to a gate of the TFT element Tr of the sub-pixels SPix via the scanning lines GCL illustrated in FIG. 10 to sequentially select, as a display driving target, a row (one horizontal line) of the sub-pixels SPix formed in a matrix in the liquid crystal display unit 20. The source driver 13 illustrated in FIG. 1 supplies the pixel signals Vpix to the sub-pixel SPix configuring one horizontal line that is sequentially selected by the gate driver 12 via the signal lines SGL illustrated in FIG. 10. In these sub-pixels SPix, one horizontal line is displayed corresponding to the supplied pixel signals Vpix. The drive electrode driver 14 illustrated in FIG. 1 applies the driving signal Vcom to drive the drive electrodes COML for each drive electrode block B including the predetermined number of drive electrodes COML illustrated in FIG. 7.

As described above, in the liquid crystal display unit 20, each of the horizontal lines is sequentially selected when the gate driver 12 drives the scanning line GCL to perform sequential scanning in a time division manner. In the liquid crystal display unit 20, the source driver 13 supplies the pixel signals Vpix to the sub-pixels SPix belonging to one horizontal line, so that the horizontal lines are displayed one by one. When the display operation is performed, the drive electrode driver 14 applies the display driving voltage VcomDC to a drive electrode block B including the electrode pattern of the drive electrode COML corresponding to the horizontal line.

Figure 12:
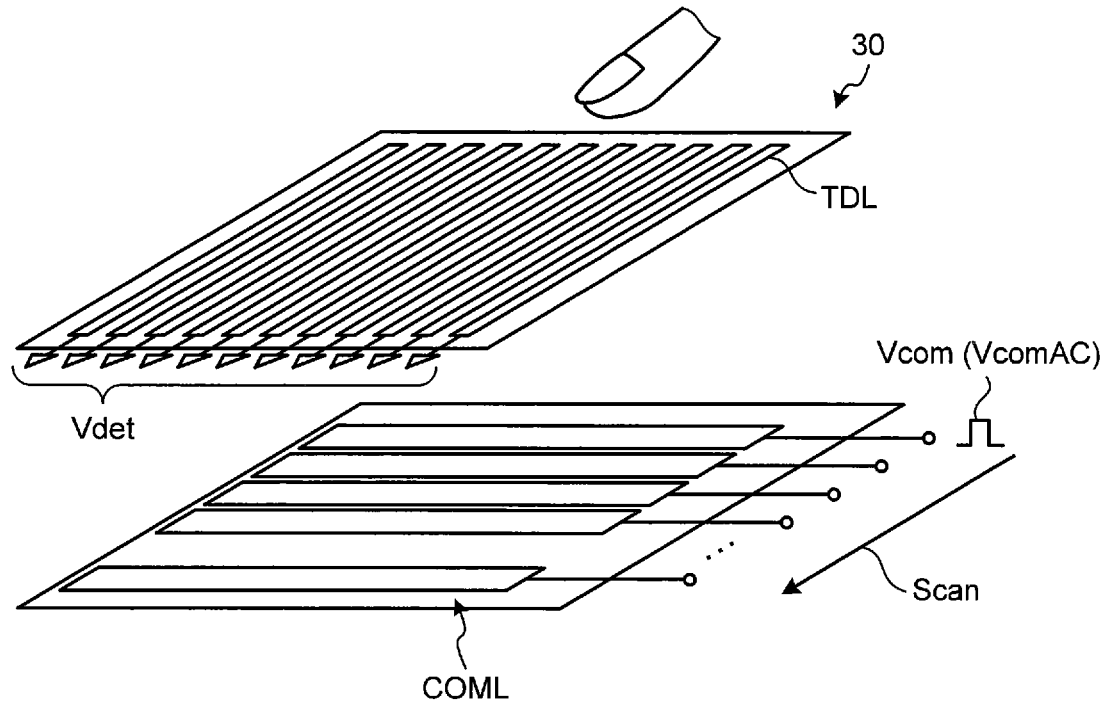
FIG. 12 is a perspective view illustrating a configuration example of drive electrodes and touch detection electrodes of the display unit with a touch detection function according to the first embodiment.

The drive electrode COML according to the present embodiment functions as a drive electrode (common electrode) of the liquid crystal display unit 20, and also functions as a drive electrode of the touch detection device 30. FIG. 12 is a perspective view illustrating a configuration example of the drive electrodes and the touch detection electrodes of the display unit with a touch detection function according to the first embodiment. As illustrated in FIG. 8, the drive electrodes COML illustrated in FIG. 12 are opposed to the pixel electrodes 22 in a direction vertical to the surface of the TFT substrate 21. The touch detection device 30 includes the drive electrodes COML provided to the pixel substrate 2 and the touch detection electrodes TDL provided to the counter substrate 3. The touch detection electrodes TDL are configured by stripe electrode patterns extending in a direction intersecting the extending direction of the electrode patterns of the drive electrodes COML. The touch detection electrodes TDL are opposed to the drive electrodes COML in the direction vertical to the surface of the TFT substrate 21. Each electrode pattern of the touch detection electrode TDL is coupled to an input of the amplifier 42 of the touch detection unit 40. The electrode patterns of the drive electrodes COML and the touch detection electrodes TDL form capacitance at each intersection thereof. The touch detection electrodes TDL and the drive electrodes COML (drive electrode block B) are not limited to a shape that is divided into a plurality of stripe pieces. The touch detection electrode TDL and the drive electrode COML (drive electrode block) may, for example, have a comb-teeth shape. Alternatively, it is sufficient that the touch detection electrodes TDL or the drive electrodes COML (drive electrode block) has a shape divided into a plurality of pieces, and a shape of the slit that divides the electrode may be a straight line or a curved line.

With this configuration, when the touch detection operation is performed in the touch detection device 30, the drive electrode driver 14 drives the drive electrode block B illustrated in FIG. 7 to perform line-sequential scanning in a time division manner. Accordingly, the drive electrode block B (one detection block) of the drive electrodes COML is sequentially selected in a scanning direction Scan. The touch detection device 30 outputs the touch detection signals Vdet from the touch detection electrodes TDL. In this way, in the touch detection device 30, touch detection for one detection block is performed.

Figure 13:
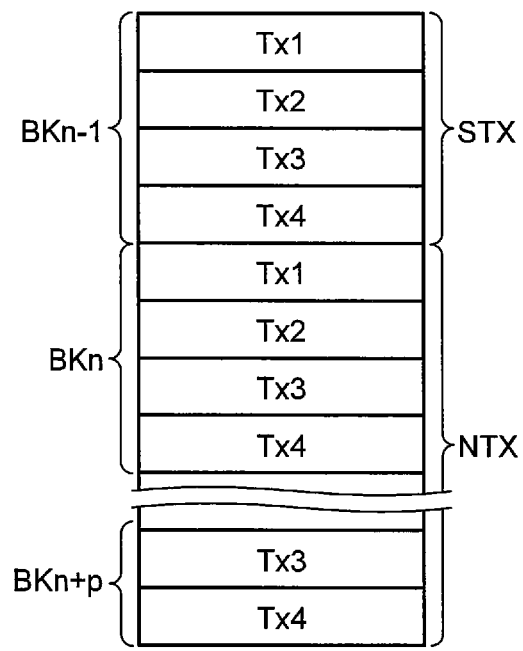
FIG. 13 is a schematic diagram illustrating an operation example of touch detection in the display device with a touch detection function according to the first embodiment.
Figure 14:
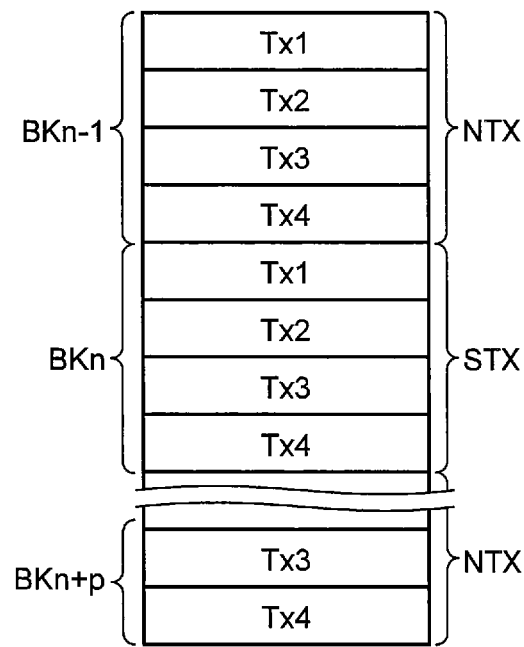
FIG. 14 is a schematic diagram illustrating an operation example of touch detection in the display device with a touch detection function according to the first embodiment.
Figure 15:
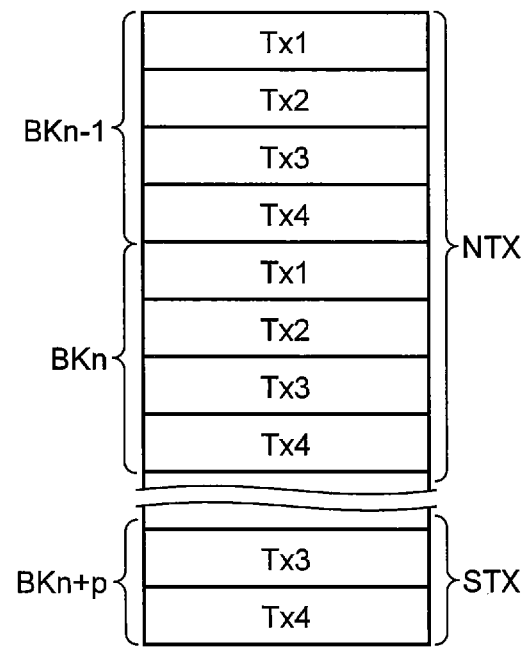
FIG. 15 is a schematic diagram illustrating an operation example of touch detection in the display device with a touch detection function according to the first embodiment.

FIG. 13, FIG. 14, and FIG. 15 are schematic diagrams illustrating an operation example of touch detection in the display device with a touch detection function according to the first embodiment. For example, five sets of drive electrode blocks Tx1, Tx2, Tx3, and Tx4 illustrated in FIG. 13, FIG. 14, and FIG. 15 are arranged in the scanning direction. Accordingly, the number of drive electrode blocks B is twenty. A selection drive electrode block STX represents the drive electrode block B to which the touch driving signal VcomAC is applied. A non-selection drive electrode block NTX is in a state in which a voltage is not applied to the drive electrode block B and an electric potential is not fixed, what is called a floating state. The non-selection drive electrode block NTX may be applied with the display driving voltage VcomDC to fix the electric potential thereof. The drive electrode driver 14 illustrated in FIG. 1 simultaneously selects the drive electrode blocks Tx1, Tx2, Tx3, and Tx4 of a selection drive electrode block BKn−1 among all of the drive electrode blocks B (refer to FIG. 7) to be a target of the touch detection operation, and applies the touch driving signal VcomAC, as illustrated in FIG. 13. Next, the drive electrode driver 14 selects the drive electrode blocks Tx1, Tx2, Tx3, and Tx4 of a selection drive electrode block BKn among all of the drive electrode blocks B (refer to FIG. 7), and applies the touch driving signal VcomAC, as illustrated in FIG. 14. After repeating the same operation, the drive electrode driver 14 selects the drive electrode blocks Tx1, Tx2, Tx3, and Tx4 of a selection drive electrode block BKn+p among all of the drive electrode blocks B (refer to FIG. 7), and applies the touch driving signal VcomAC, as illustrated in FIG. 15. In this way, the drive electrode driver 14 sequentially selects the selection drive electrode blocks BKn−1, BKn . . . BKn+p for every certain number (four in the first embodiment) of all the drive electrode blocks B (refer to FIG. 7), and applies the touch driving signal VcomAC utilizing code-division multiplexed (CDM) driving to scan over all of the drive electrode blocks B. Hereinafter, the selection drive electrode blocks BKn−1, BKn . . . BKn+p for every certain number that are simultaneously selected as the selection drive electrode block STX may be collectively represented as the selection drive electrode block BKn. Regarding the selection drive electrode blocks BKn−1, BKn . . . BKn+p, an example in which the drive electrode blocks Tx1, Tx2, Tx3, and Tx4 are selected for every four drive electrode blocks is illustrated. In the present embodiment, the certain number of the drive electrode blocks B simultaneously selected as the selection drive electrode block STX is not limited to four, and may be two, three, or five or more. The total number of the drive electrode blocks B is not limited to twenty.

In the touch detection device 30, one of drive electrode blocks B1 to B20 illustrated in FIG. 13 to FIG. 15 corresponds to a drive electrode E1 in the basic principle of the capacitive touch detection described above. In the touch detection device 30, one of the touch detection electrodes TDL corresponds to a touch detection electrode E2. The touch detection device 30 is configured to perform touch detection according to the basic principle described above. As illustrated in FIG. 12, the electrode patterns intersecting each other form capacitive touch sensors in a matrix. Accordingly, the display device with a touch detection function 1 according to the first embodiment can detect a position where an external proximity object is in contact with or in proximity to the device by time-division multiplexed (TDM) driving for scanning the drive electrode blocks B1 to B20 one by one across the entire touch detection surface of the touch detection device 30.

Code-Division Multiplexed (CDM) Driving

Figure 16:
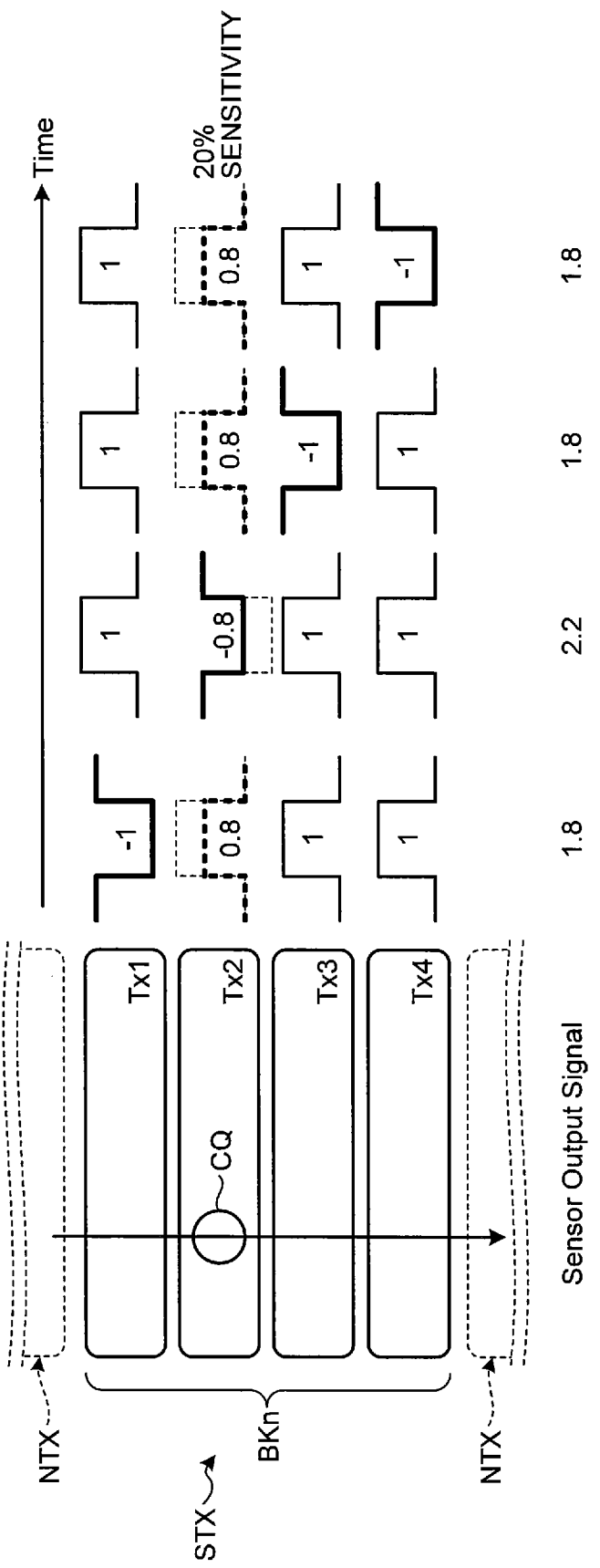
FIG. 16 is an explanatory diagram illustrating an operation example of code-division multiplexed driving in the display device with a touch detection function according to the first embodiment.

FIG. 16 is an explanatory diagram illustrating an operation example of code-division multiplexed driving in the display device with a touch detection function according to the first embodiment. As illustrated in FIG. 16, in the display unit with a touch detection function 10, the drive electrode driver 14 simultaneously selects the four drive electrode blocks Tx1, Tx2, Tx3, and Tx4 of the selection drive electrode block BKn, and supplies the drive electrode blocks with the touch driving signals VcomAC each of which has a phase determined for each drive electrode block based on a certain code. The certain code is, for example, defined by a square matrix of an equation (1) described below, and the degree of the square matrix is four, which is the number of the drive electrode blocks Tx1, Tx2, Tx3, and Tx4 in the selection drive electrode block BKn. A diagonal component "−1" of the square matrix in the equation (1) is different from a component "1" other than the diagonal component of the square matrix. The drive electrode driver 14 applies the touch driving signals VcomAC based on the square matrix of the equation (1) so that the phase of the alternating-current (AC) rectangular wave Sg corresponding to the component "1" other than the diagonal component of the square matrix and the phase of the AC rectangular wave Sg corresponding to the diagonal component "−1" of the square matrix are inverted. The code "−1" supplies the touch driving signal VcomAC of which phase is determined to be different from that of the code "1".

When there is an object CQ approaching from the outside such as a finger at the drive electrode block Tx2 that is the second position from an upstream side of the scanning direction of the drive electrode blocks Tx1, Tx2, Tx3, and Tx4 of the selection drive electrode block BKn, a difference voltage is caused by the object CQ approaching from the outside by mutual induction (for example, suppose that the difference voltage is 20%). The touch detection signals (sensor output signals) detected by the touch detection unit 40 in a first time period are represented as (−1)+(0.8)+(1)+(1)=1.8. The touch detection signals (sensor output signals) detected by the touch detection unit 40 in a second time period are represented as (1)+(−0.8)+(1)+(1)=2.2. The touch detection signals (sensor output signals) detected by the touch detection unit 40 in a third time period are represented as (1)+(0.8)+(−1)+(1)=1.8. The touch detection signals (sensor output signals) detected by the touch detection unit 40 in a fourth time period are represented as (1)+(0.8)+(1)+(−1)=1.8.

The coordinate extractor 45 multiplies the touch detection signals detected by the signal processor 44 by the square matrix of the equation (1) below, and detects that there is the object CQ approaching from the outside such as a finger at a position of the drive electrode block Tx2 of the selection drive electrode block BKn with detection sensitivity that is four times that of the time-division multiplexed (TDM) driving, without increasing the voltage. Then the coordinate extractor 45 outputs the touch panel coordinates as a signal output Vout.

Equation 1

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.8 \\ 2.2 \\ 1.8 \\ 1.8 \end{pmatrix} = \begin{pmatrix} 4.0 \\ 3.2 \\ 4.0 \\ 4.0 \end{pmatrix} \quad (1)$$

In the display device with a touch detection function 1 according to the first embodiment, the detection sensitivity for touch detection is increased, touch detection accuracy is improved, and the touch detection can be performed in a short time.

In the display unit with a touch detection function 10, the drive electrode driver 14 simultaneously selects the four drive electrode blocks Tx1, Tx2, Tx3, and Tx4 of the selection drive electrode block BKn, and supplies the touch driving signals VcomAC each of which has a phase determined for each drive electrode block based on the certain code. Accordingly, the number of power supply lines for supplying the touch driving signal needs to be equal to or more than the number of the drive electrode blocks of the selection drive electrode block BKn. When the number of power supply lines increases, the frame Gd is widened.

Driving Signal Generation Unit and Drive Electrode Driver

Figure 17:
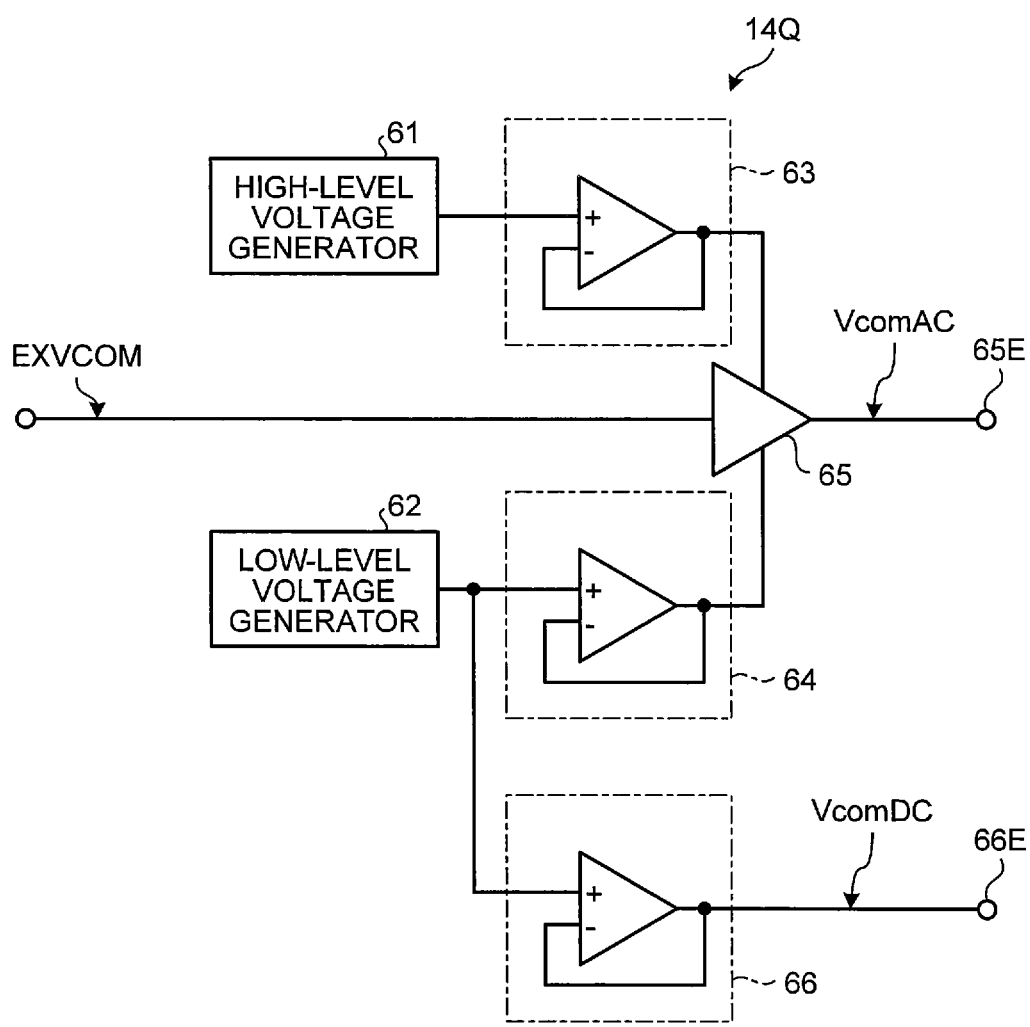
FIG. 17 is a block diagram illustrating a driving signal generation unit of a drive electrode driver according to the first embodiment.

Therefore, according to the first embodiment, the drive electrode scanning unit 14A (14B) of the drive electrode driver 14 supplies each touch driving signal of which phase is determined based on the certain code defined by the square matrix of the equation (1) described above to the selected drive electrode when the number of drive electrode blocks to be simultaneously selected is larger than 2, which is the number of pieces of power supply wiring. FIG. 17 is a block diagram illustrating the driving signal generation unit of the drive electrode driver according to the first embodiment. A driving signal generation unit 14Q includes a high-level voltage generator 61, a low-level voltage generator 62, buffers 63, 64, and 66, and a switching circuit 65.

The high-level voltage generator 61 generates a high-level voltage of the touch driving signal VcomAC. The low-level voltage generator 62 generates a direct-current (DC) voltage of the display driving voltage VcomDC. The voltage generated by the low-level voltage generator 62 is also used as a low-level voltage of the touch driving signal VcomAC. The buffer 63 outputs the voltage supplied from the high-level voltage generator 61 while performing impedance conversion, and supplies the voltage to the switching circuit 65. The buffer 64 outputs the voltage supplied from the low-level voltage generator 62 while performing impedance conversion, and supplies the voltage to the switching circuit 65. In the switching circuit 65, a case in which a drive control signal EXVCOM is high level and a case in which the drive control signal EXVCOM is low level are alternately repeated based on the drive control signal EXVCOM, and thereby the touch driving signal VcomAC is generated. The switching circuit 65 outputs the voltage supplied from the buffer 63 when the drive control signal EXVCOM is high level, and outputs the voltage supplied from the buffer 64 when the drive control signal EXVCOM is low level. The switching circuit 65 outputs the voltage supplied from the buffer 64 as the DC voltage of the display driving voltage VcomDC when the drive control signal EXVCOM is low level, based on the drive control signal EXVCOM. Each of the buffers 63 and 64 is configured by a voltage follower, for example. The voltage output from the switching circuit 65 is output to an output terminal 65E. The buffer 66 outputs the voltage supplied from the low-level voltage generator 62 while performing impedance conversion and supplies the DC voltage of the display driving voltage VcomDC to the output terminal 66E.

Figure 18:
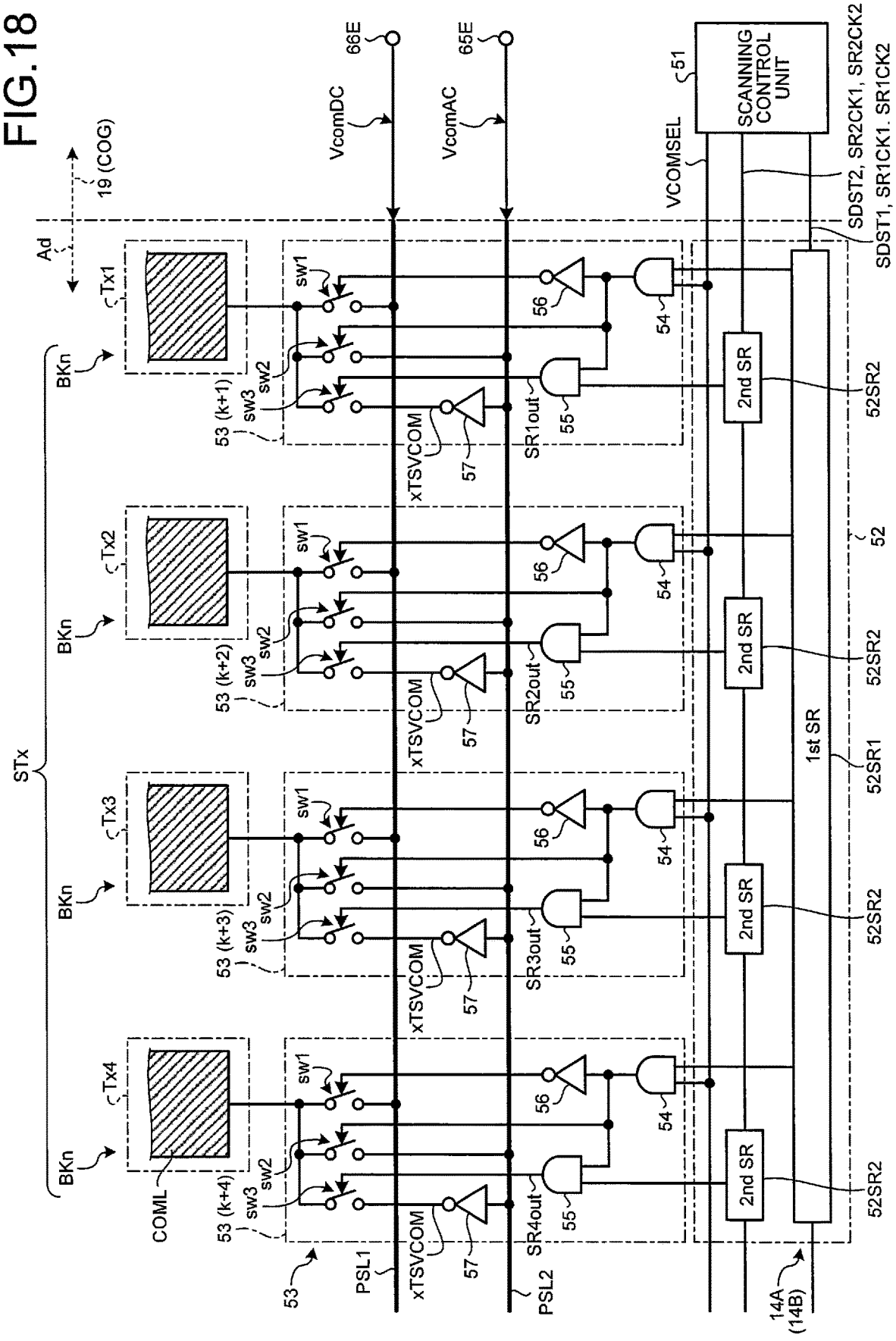
FIG. 18 is a block diagram illustrating the drive electrode driver according to the first embodiment.
Figure 19:
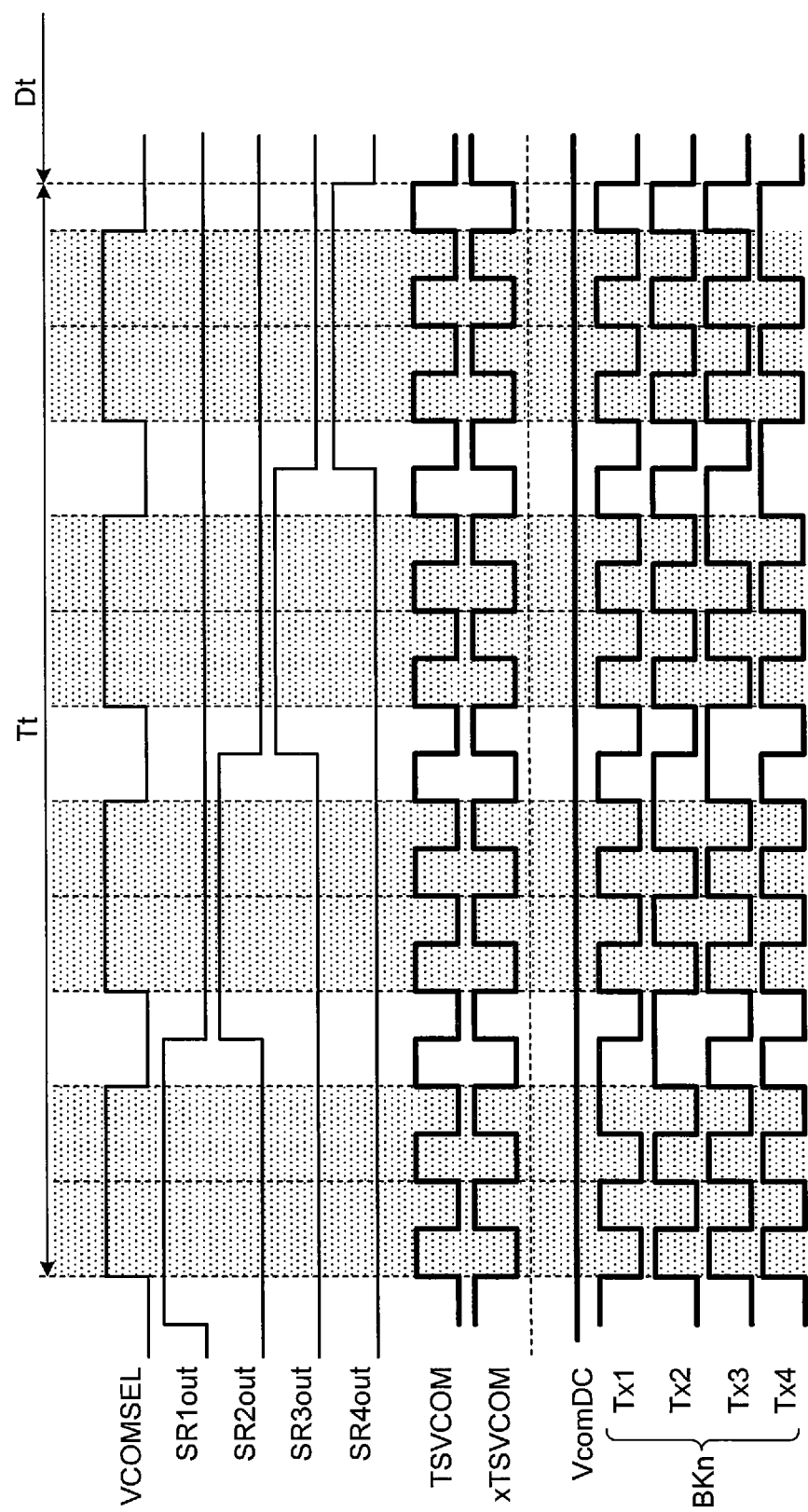
FIG. 19 is an explanatory diagram illustrating an example of a timing waveform of the display device with a touch detection function according to the first embodiment.

FIG. 18 is a block diagram illustrating the drive electrode driver according to the first embodiment. FIG. 19 is an explanatory diagram illustrating an example of a timing waveform of the display device with a touch detection function. Although FIG. 18 and FIG. 19 illustrate the configuration of the drive electrode scanning unit 14A, the configuration of the drive electrode scanning unit 14B is substantially the same. The current selection drive electrode block BKn includes the four drive electrode blocks Tx1 to Tx4. The drive electrode scanning units 14A and 14B include a scanning control unit 51, a touch detection scanning unit 52, and a driving unit 53. The driving unit 53 includes driving units 53(k+1) to 53(k+4) of which number is equal to the number of the drive electrode blocks Tx1 to Tx4. The scanning control unit 51 is mounted to the COG 19. The touch detection scanning unit 52 and the driving unit 53 are arranged in the frame Gd at the periphery of the display region Ad. Hereinafter, the "driving unit 53" may be simply used to indicate any one of the driving units 53(k+1) to 53(k+4).

The scanning control unit 51 supplies control signals SDCK (SR1CK1, SR1CK2, SR2CK1, and SR2CK2) and scanning start signals SDST (SDST1 and SDST2) to the touch detection scanning unit 52 based on the control signal supplied from the control unit 11. To the first power supply wiring PSL1, supplied is the display driving voltage VcomDC output via the output terminal 66E from the driving signal generation unit 14Q. To the second power supply wiring PSL2, supplied is the touch driving signal VcomAC output via the output terminal 65E from the driving signal generation unit 14Q. The scanning control unit 51 supplies, toward the driving unit 53, a drive electrode selection signal VCOMSEL which is high level when the touch driving signal VcomAC is supplied from the driving signal generation unit 14Q.

The touch detection scanning unit 52 includes a first scanning signal output circuit 52SR1 that simultaneously selects the drive electrode blocks Tx1, Tx2, Tx3, and Tx4, and second scanning signal output circuits 52SR2 that select the drive electrode blocks Tx1, Tx2, Tx3, and Tx4 one by one. The first scanning signal output circuit 52SR1 includes a drive electrode shift register 1stSR, and generates scanning signals SR1out, SR2out, SR3out, SR4out . . . for selecting the drive electrode COML to which the touch driving signal VcomAC is applied. Specifically, in the touch detection scanning unit 52, the scanning start signal SDST1 that is supplied from the scanning control unit 51 and serves as a trigger is sequentially transferred for each transfer stage of the shift register 52SR in synchronization with the control signals SR1CK1 and SR1CK2, and thus each of shift register 1stSR is sequentially selected. The selected shift register 1stSR sends out the scanning signals SR1out, SR2out, SR3out, SR4out . . . illustrated in FIG. 19 to each AND circuit 54 of the driving unit 53. Hereinafter, the "scanning signal SRout" may be used to indicate any one of the scanning signals SR1out, SR2out, SR3out, SR4out . . . .

The driving unit 53 is a circuit that applies the touch driving signal VcomAC or the display driving voltage VcomDC supplied from the driving signal generation unit 14Q to the drive electrode COML based on the scanning signal SRout supplied from the touch detection scanning unit 52 and the drive electrode selection signal VCOMSEL supplied from the scanning control unit 51. One driving unit 53 is provided corresponding to an output signal from the touch detection scanning unit 52, and applies the driving signal Vcom to the corresponding drive electrode block B.

The driving unit 53 includes the AND circuit 54 and selection switches sw1, sw2, and sw3 for each drive electrode block B. The AND circuit 54 generates and outputs a logical product (AND) of the scanning signal SRout supplied from the touch detection scanning unit 52 and the drive electrode selection signal VCOMSEL supplied from the scanning control unit 51. An operation of the selection switch sw2 is controlled based on a signal supplied from the AND circuit 54. An end of the selection switch sw2 is coupled to the drive electrodes COML included in the drive electrode block B, and the other end of the selection switch sw2 is coupled to the second power supply wiring PSL2. An operation of the selection switch sw1 is controlled based on an inverter 56 that inverts the signal supplied from the AND circuit 54. An end of the selection switch sw1 is coupled to the drive electrodes COML included in the drive electrode block B, and the other end of the selection switch sw1 is coupled to the first power supply wiring PSL1.

The second scanning signal output circuit 52SR2 includes a drive electrode shift register 2ndSR, and generates a scanning signal that selects any one of the drive electrodes Tx1, Tx2, Tx3, and Tx4 that invert the phase of the touch driving signal VcomAC in order to apply the touch driving signals VcomAC to the selection drive electrode block BKn selected by the first scanning signal output circuit 52SR1. Specifically, in the touch detection scanning unit 52, the scanning start signal SDST2 that is supplied from the scanning control unit 51 and serves as a trigger is sequentially transferred for each transfer stage of the shift register 2ndSR in synchronization with the control signals SR2CK1 and SR2CK2, and thus each of the shift register 2ndSR is sequentially selected. The selected shift register 2ndSR sends out the scanning signals to each AND circuit 55 of the driving unit 53.

The AND circuit 55 generates a logical product (AND) of the scanning signal supplied from the second scanning signal output circuit 52SR2 and the signal supplied from the AND circuit 54, and outputs the logical product to the selection switch sw3. In the second scanning signal output circuit 52SR2, for example, when the selected shift register 2ndSR supplies a high-level signal as a k+2-th scanning signal to a k+2-th driving unit 53(k+2) and the AND circuit 54 supplies a high-level signal, the selection switch sw1 and the selection switch sw2 are turned off and the selection switch sw3 is turned on. The driving unit 53(k+2) applies an inverted waveform xTSVCOM obtained by inverting a waveform TSVCOM of the driving signal VcomAC by an inverter 57 to the drive electrodes COML belonging to a k+2-th drive electrode block B(k+2).

As illustrated in FIG. 19, when the scanning signal SRout is high level and the drive electrode selection signal VCOMSEL is high level, the driving unit 53 outputs the touch driving signal VcomAC as the driving signal Vcom to the four drive electrode blocks Tx1 to Tx4. When the scanning signal supplied from the second scanning signal output circuit 52SR2 is low level, in the driving unit 53, the selection switch sw1 and the selection switch sw3 are turned off and the selection switch sw2 is turned on. The driving units 53(k+1), (k+3), and (k+4), for example, apply the waveform TSVCOM of the driving signal VcomAC to the drive electrodes COML belonging to the drive electrode block B(k+2).

As illustrated in FIG. 19, when the scanning signal supplied from the second scanning signal output circuit 52SR2 is high level, in the driving unit 53, the selection switch sw1 and the selection switch sw2 are turned off and the selection switch sw3 is turned on. The driving unit 53(k+2), for example, applies the inverted waveform xTSVCOM of the waveform TSVCOM of the driving signal VcomAC to the drive electrodes COML belonging to the drive electrode block B(k+2). The scanning signal supplied from the second scanning signal output circuit 52SR2 is output based on a code of the diagonal component "−1" in the square matrix of (1) described above. Accordingly, timing of applying the inverted waveform xTSVCOM of the waveform TSVCOM is sequentially shifted from the drive electrode block Tx1 to the drive electrode block Tx4.

When the scanning signal SRout is low level and the drive electrode selection signal VCOMSEL is high level, the driving unit 53 separates the drive electrode block B from the second power supply wiring PSL2 to be coupled to the first power supply wiring PSL1. The drive electrode block B selected as an output destination of the touch driving signal VcomAC is the selection drive electrode block BKn. The drive electrode block B that is not selected as the output destination of the touch driving signal VcomAC is the non-selection drive electrode block NTX as described above. The driving unit 53 can cause the non-selection drive electrode block NTX to be in the floating state in which the electric potential is not fixed by turning off the selection switch sw1, the selection switch sw2, and the selection switch sw3. The driving unit 53 can cause the electric potential of the non-selection drive electrode block NTX to be the display voltage VcomDC by turning on the selection switch sw1 and turning off the selection switch sw2 and the selection switch sw3.

When the liquid crystal display unit 20 performs display operation, in the driving unit 53, the scanning signal SRout is low level, entire wiring is coupled to the first power supply wiring PSL1 via one selection switch sw1 for each drive electrode block B, and the display driving voltage VcomDC is output as the driving signal Vcom. The display device with a touch detection function 1 according to the first embodiment supplies the driving signal Vcom (the display driving voltage VcomDC and the driving signal VcomAC) to the drive electrode COML in a time division manner, in a touch detection operation (touch detection operation period Tt) and in a display operation (display period Dt), separately. As described above, the display device with a touch detection function 1 according to the first embodiment may supply the driving signal Vcom (the display driving voltage VcomDC and the driving signal VcomAC) to the drive electrode COML in a time division manner in one display horizontal period, in the touch detection operation (touch detection operation period Tt) and in the display operation (display period Dt), separately. The display device with a touch detection function 1 according to the first embodiment may supply the driving signal Vcom (the display driving voltage VcomDC and the driving signal VcomAC) to the drive electrode COML in a time division manner in one display horizontal period, in a plurality of touch detection operations (touch detection operation periods Tt) and in a plurality of display operations (display periods Dt), separately. The display device with a touch detection function 1 according to the first embodiment may process display operations for a plurality of horizontal periods in one display period Dt, in the touch detection operation (touch detection operation period Tt) and in the display operation (display period Dt), separately.

Herein, the TFT substrate 21 corresponds to a specific example of the "substrate" in the present disclosure. The pixel electrode 22 corresponds to a specific example of the "pixel electrode" in the present disclosure. The signal line SGL corresponds to a specific example of the "signal line" in the present disclosure. The drive electrode COML corresponds to a specific example of the "drive electrode" in the present disclosure. The liquid crystal element LC corresponds to a specific example of the "display functional layer" in the present disclosure. The gate driver 12, the source driver 13, and the drive electrode driver 14 correspond to a specific example of the "control device" in the present disclosure. The touch detection electrode TDL corresponds to the "touch detection electrode" in the present disclosure. The first power supply wiring PSL1 corresponds to a specific example of the "first power supply wiring" in the present disclosure. The second power supply wiring PSL2 corresponds to a specific example of the "second power supply wiring" in the present disclosure.

As described above, the display device with a touch detection function 1 according to the first embodiment routes, to the frame region, the first power supply wiring PSL1 that supplies the display driving voltage VcomDC to the drive electrode COML and the second power supply wiring PSL2 that supplies the touch driving signal VcomAC to the drive electrode COML. With only two pieces of power supply wiring routed to the frame region, that is, the first power supply wiring PSL1 and the second power supply wiring PSL2, it is possible to drive the drive electrode blocks of which number is equal to or larger than the number of pieces of the first power supply wiring PSL1 and the second power supply wiring PSL2.

For example, when the first power supply wiring PSL1 and the second power supply wiring PSL2 are arranged along a plane parallel to the surface of the TFT substrate 21, parasitic capacity of the drive electrode block B should be considered. In the drive electrode block B arranged at a position away from the COG 19 (driving signal generation unit), transition time of a pulse of the driving signal VcomAC may be increased. Therefore, it is effective that a wiring width is widened, for example about 100 µm to 200 µm, to lower resistance in the first power supply wiring PSL1 and the second power supply wiring PSL2. Accordingly, even when a plurality of drive electrode blocks are simultaneously selected and CDM-driven, the number of pieces of power supply wiring routed to the frame region is only two, that is, the first power supply wiring PSL1 and the second power supply wiring PSL2, and a width Gdv of the frame Gd illustrated in FIG. 7 can be suppressed. As a result, the display device with a touch detection function 1 according to the first embodiment can suppress the possibility that the transition time of the pulse of the driving signal VcomAC is increased in the drive electrode block B arranged in the vicinity of a terminal part of the second power supply wiring PSL2.

As described above, in the display device with a touch detection function 1 according to the first embodiment, when the number of drive electrode blocks that the drive electrode scanning unit 14A (14B) simultaneously selects is equal to or larger than two, which is equal to the number of pieces of the power supply wiring, the drive electrode driver 14 supplies the waveform TSVCOM and the inverted waveform xTSVCOM of the touch driving signal VcomAC of which phase is determined based on the certain code (for example, the code of the square matrix illustrated in the equation (1) described above) to the selected drive electrodes. In the display device with a touch detection function according to the first embodiment, the detection sensitivity for touch detection is increased, touch detection accuracy is improved, and the touch detection can be performed in a short time.

1-2. Second Embodiment

Figure 20:
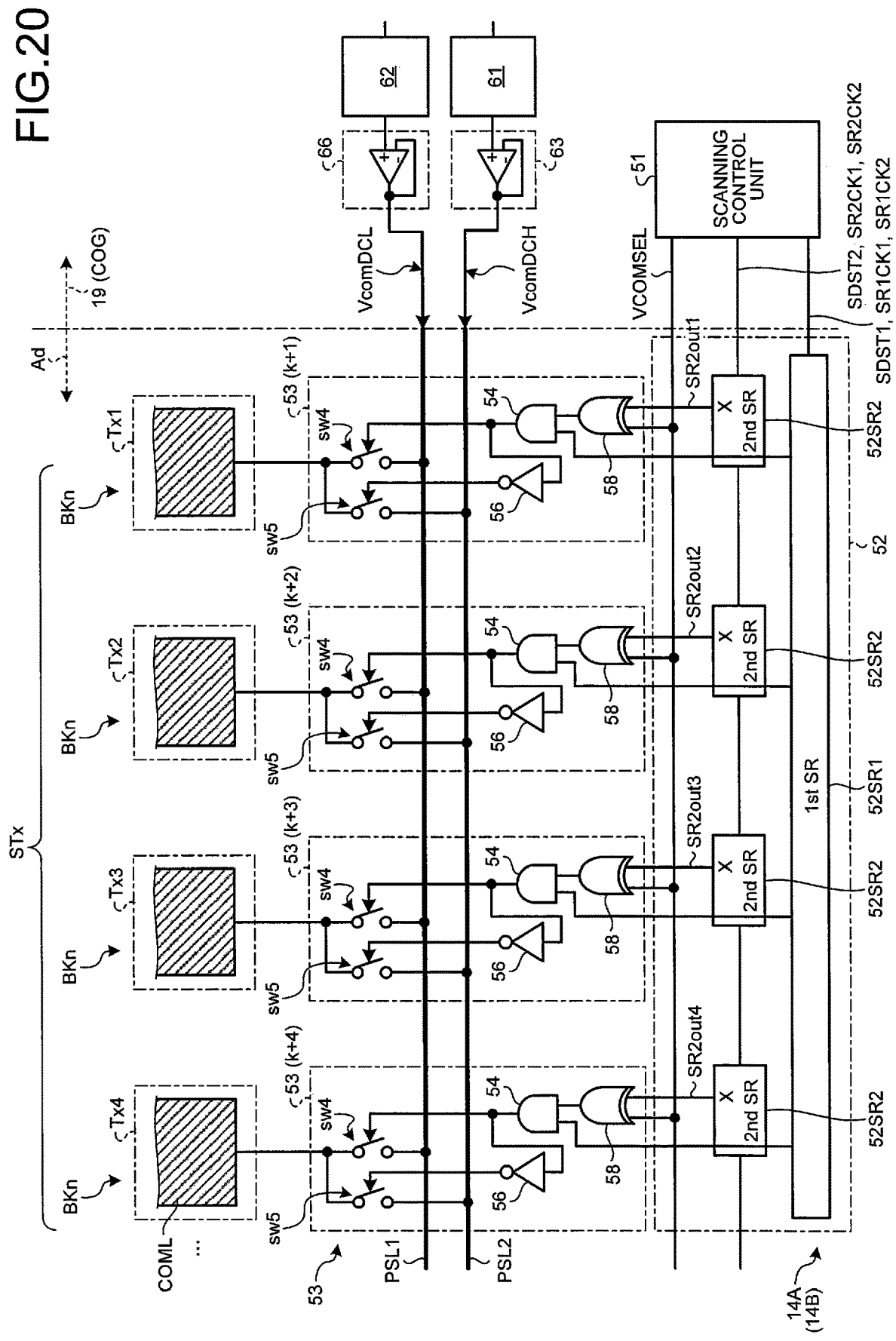
FIG. 20 is a block diagram illustrating a drive electrode driver according to a second embodiment.
Figure 21:
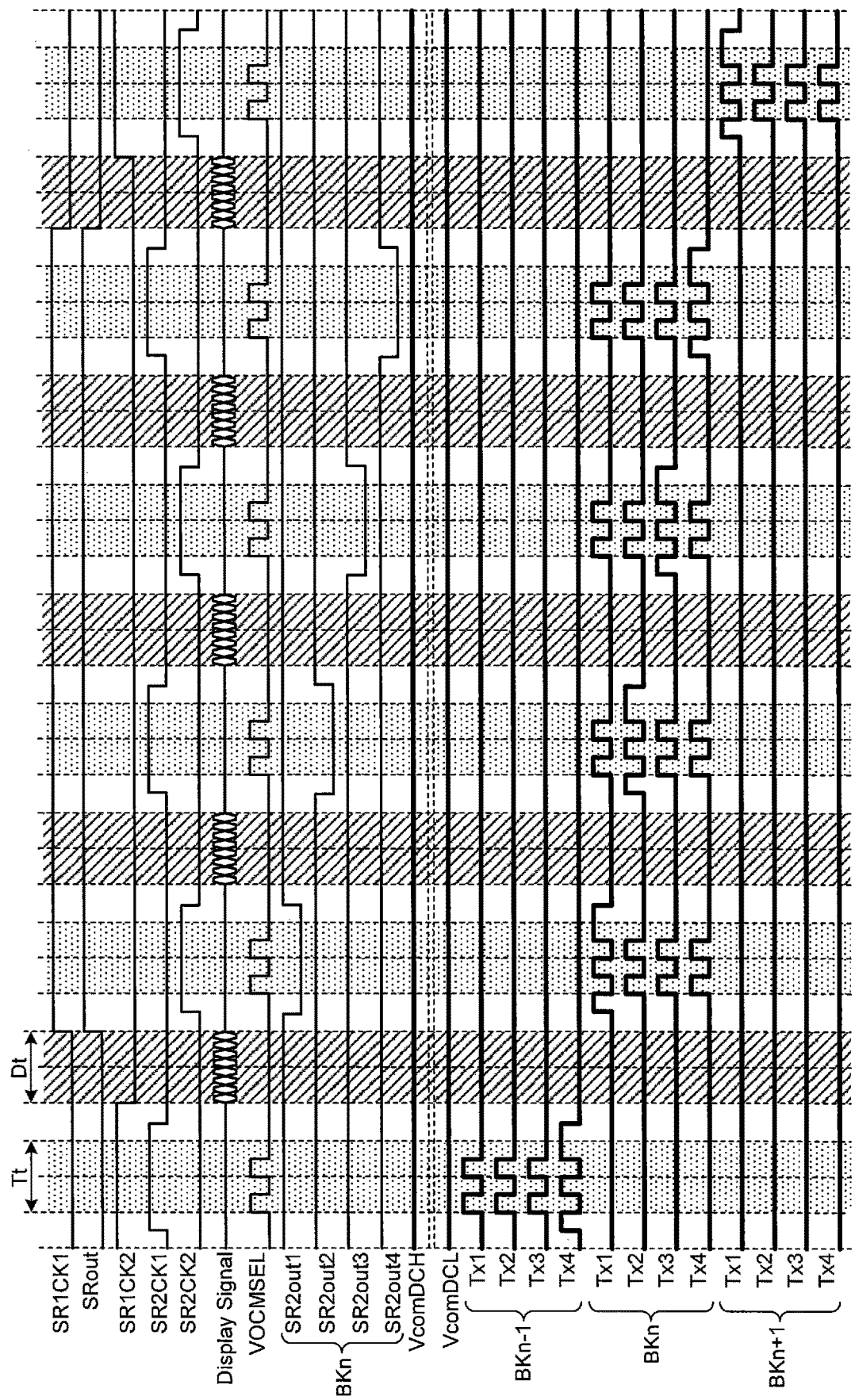
FIG. 21 is an explanatory diagram illustrating an example of a timing waveform of the display device with a touch detection function according to the second embodiment.

The following describes the display device with a touch detection function 1 according to a second embodiment. FIG. 20 is a block diagram illustrating the drive electrode driver according to the second embodiment. FIG. 21 is an explanatory diagram illustrating an example of a timing waveform of the display device with a touch detection function according to the second embodiment. The same components as those described in the first embodiment are denoted by the same reference numerals, and redundant description will not be repeated. Although FIG. 20 and FIG. 21 illustrate the configuration of the drive electrode scanning unit 14A, the configuration of the drive electrode scanning unit 14B is substantially the same.

The high-level voltage generator 61 generates a high-level voltage VcomDCH of the touch driving signal VcomAC to be supplied to the second power supply wiring PSL2 via the buffer 63. The low-level voltage generator 62 generates a DC voltage of the display driving voltage VcomDC to be supplied to the second power supply wiring PSL2 via the buffer 66. The voltage generated by the low-level voltage generator 62 is also used as a low-level voltage VcomDCL of the touch driving signal VcomAC to be supplied to the second power supply wiring PSL2 via the buffer 63.

The driving unit 53 includes the AND circuit 54, an exclusive OR circuit 58, the inverter 56, and selection switches sw4 and sw5 for each drive electrode block B. The AND circuit 54 generates and outputs a logical product (AND) of the scanning signal SRout supplied from the touch detection scanning unit 52 and the drive electrode selection signal VCOMSEL supplied from the scanning control unit 51. An operation of the selection switch sw4 is controlled based on the signal supplied from the AND circuit 54. An end of the selection switch sw4 is coupled to the drive electrodes COML included in the drive electrode block B, and the other end of the selection switch sw4 is coupled to the first power supply wiring PSL1. An operation of the selection switch sw5 is controlled based on the inverter 56 that inverts the signal supplied from the AND circuit 54. An end of the selection switch sw5 is coupled to the drive electrodes COML included in the drive electrode block B, and the other end of the selection switch sw5 is coupled to the second power supply wiring PSL2.

The second scanning signal output circuit 52SR2 includes a drive electrode shift register 2ndSR, and generates scanning signals SR2out1 to SR2out4 that select any one of the drive electrodes Tx1, Tx2, Tx3, and Tx4 that invert the phase of the touch driving signal VcomAC in order to apply the touch driving signals to the selection drive electrode block BKn selected by the first scanning signal output circuit 52SR1. Specifically, in the touch detection scanning unit 52, the scanning start signal SDST2 that is supplied from the scanning control unit 51 and serves as a trigger is sequentially transferred for each transfer stage of the shift register 2ndSR in synchronization with the control signals SR2CK1 and SR2CK2, and thus each of the shift register 2ndSR is sequentially selected. The selected shift register 2ndSR inverts the scanning signals to be sent out to the exclusive OR circuit 58 of the driving unit 53.

The exclusive OR circuit 58 generates an exclusive OR (XOR) of the scanning signal supplied from the second scanning signal output circuit 52SR2 and the drive electrode selection signal VCOMSEL, and outputs the exclusive OR to the selection switch sw4. As illustrated in FIG. 21, the drive electrode selection signal VCOMSEL is an AC rectangular wave having a certain frequency.

As illustrated in FIG. 21, in the driving unit 53, the drive electrode blocks in which the scanning signal SRout is high level and that is not selected by the second scanning signal output circuit 52SR2, among the four drive electrode blocks Tx1 to Tx4, are applied with the touch driving signal VcomAC corresponding to the AC rectangular wave of the drive electrode selection signal VCOMSEL as the driving signal Vcom. As illustrated in FIG. 21, in the driving unit 53, the drive electrode block in which the scanning signal SRout is high level and that is selected by the second scanning signal output circuit 52SR2, among the four drive electrode blocks Tx1 to Tx4, is applied with the touch driving signal VcomAC corresponding to the inverted waveform of the AC rectangular wave of the drive electrode selection signal VCOMSEL as the driving signal Vcom.

When the scanning signal supplied from the second scanning signal output circuit 52SR2 is low level, in the driving unit 53, the selection switch sw4 and the selection switch sw5 are switched corresponding to the AC rectangular wave of the drive electrode selection signal VCOMSEL. When the scanning signal supplied from the second scanning signal output circuit 52SR2 is high level, the scanning signal supplied from the second scanning signal output circuit 52SR2 is output based on the code of the diagonal component "−1" in the square matrix of (1) described above. Accordingly, timing of applying the inverted waveform xTSVCOM of the waveform TSVCOM is sequentially shifted from the drive electrode block Tx1 to the drive electrode block Tx4.

When the liquid crystal display unit 20 performs display operation, in the driving unit 53, the scanning signal SRout is low level, entire wiring is coupled to the first power supply wiring PSL1 via one selection switch sw5 for each drive electrode block B, and the display driving voltage VcomDC is output as the driving signal Vcom. The display device with a touch detection function 1 according to the second embodiment supplies the driving signal Vcom (the display driving voltage VcomDC and the driving signal VcomAC) to the drive electrode COML in a time division manner, in the touch detection operation (touch detection operation period Tt) and in the display operation (display period Dt), separately.

As described above, the display device with a touch detection function 1 according to the second embodiment may supply the driving signal Vcom (the display driving voltage VcomDC and the driving signal VcomAC) to the drive electrode COML in a time division manner in one display horizontal period, in a plurality of touch detection operations (touch detection operation periods Tt) and in a plurality of display operations (display periods Dt), separately.

Figure 22:
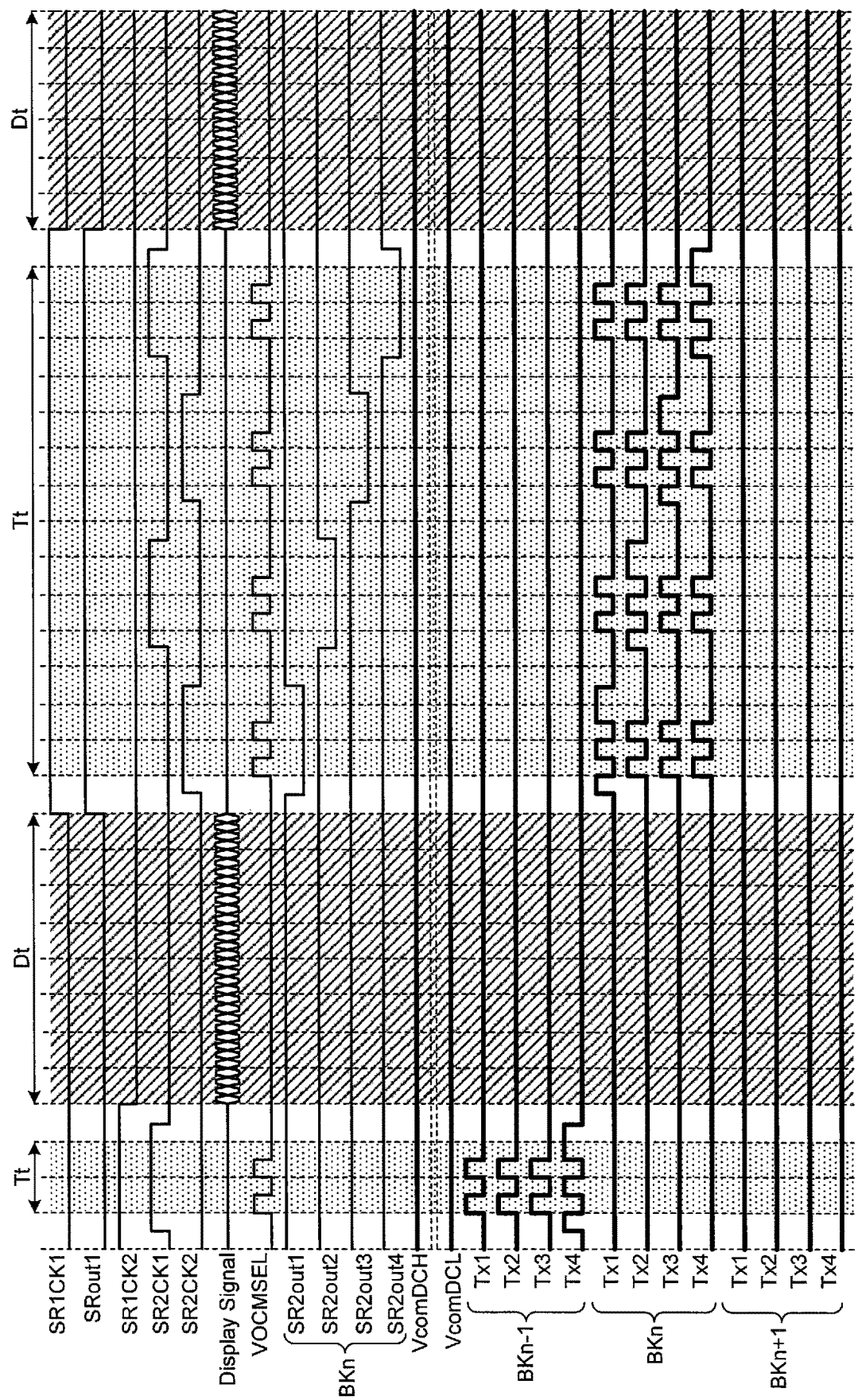
FIG. 22 is an explanatory diagram illustrating another example of the timing waveform of the display device with a touch detection function according to the second embodiment.

FIG. 22 is an explanatory diagram illustrating another example of the timing waveform of the display device with a touch detection function according to the second embodiment. As illustrated in FIG. 22, the display device with a touch detection function 1 according to the second embodiment may supply the driving signal Vcom (the display driving voltage VcomDC and the driving signal VcomAC) to the drive electrode COML in a time division manner in one display horizontal period, in the touch detection operation (touch detection operation period Tt) and in the display operation (display period Dt), separately. The display device with a touch detection function 1 according to the second embodiment may process display operations for a plurality of horizontal periods in one display period Dt, in the touch detection operation (touch detection operation period Tt) and in the display operation (display period Dt), separately.

As described above, the display device with a touch detection function 1 according to the second embodiment routes, to the frame region, the first power supply wiring PSL1 that supplies the display driving voltage VcomDC to the drive electrode COML and the second power supply wiring PSL2 that supplies the touch driving signal VcomAC to the drive electrode COML. With only two pieces of power supply wiring routed to the frame region, that is, the first power supply wiring PSL1 and the second power supply wiring PSL2, it is possible to drive the drive electrode blocks of which number is equal to or larger than the number of pieces of the first power supply wiring PSL1 and the second power supply wiring PSL2.

For example, when the first power supply wiring PSL1 and the second power supply wiring PSL2 are arranged along a plane parallel to the surface of the TFT substrate 21, parasitic capacity should be considered. In the drive electrode block B arranged at a position away from the COG 19 (driving signal generation unit), transition time of a pulse of the driving signal VcomAC may be increased. Therefore, it is effective that a wiring width is widened, for example about 100 μm to 200 μm, to lower resistance in the first power supply wiring PSL1 and the second power supply wiring PSL2. Accordingly, even when a plurality of drive electrode blocks are simultaneously selected and CDM-driven, the number of pieces of power supply wiring routed to the frame region is only two, that is, the first power supply wiring PSL1 and the second power supply wiring PSL2, and a width Gdv of the frame Gd illustrated in FIG. 7 can be suppressed. As a result, the display device with a touch detection function 1 according to the second embodiment can suppress the possibility that the transition time of the pulse of the driving signal VcomAC is increased in the drive electrode block B arranged in the vicinity of a terminal part of the second power supply wiring PSL2.

As described above, in the display device with a touch detection function 1 according to the second embodiment, when the number of drive electrode blocks that the drive electrode scanning unit 14A (14B) simultaneously selects is equal to or larger than two, which is equal to the number of pieces of the power supply wiring, the drive electrode driver 14 supplies the waveform TSVCOM and the inverted waveform xTSVCOM of the touch driving signal VcomAC of which phase is determined based on the certain code (for example, the code of the square matrix illustrated in the equation (1) described above) to the selected drive electrode. In the display device with a touch detection function 1 according to the second embodiment, the detection sensitivity for touch detection is increased, touch detection accuracy is improved, and the touch detection can be performed in a short time.

1-3. Third Embodiment

Figure 23:
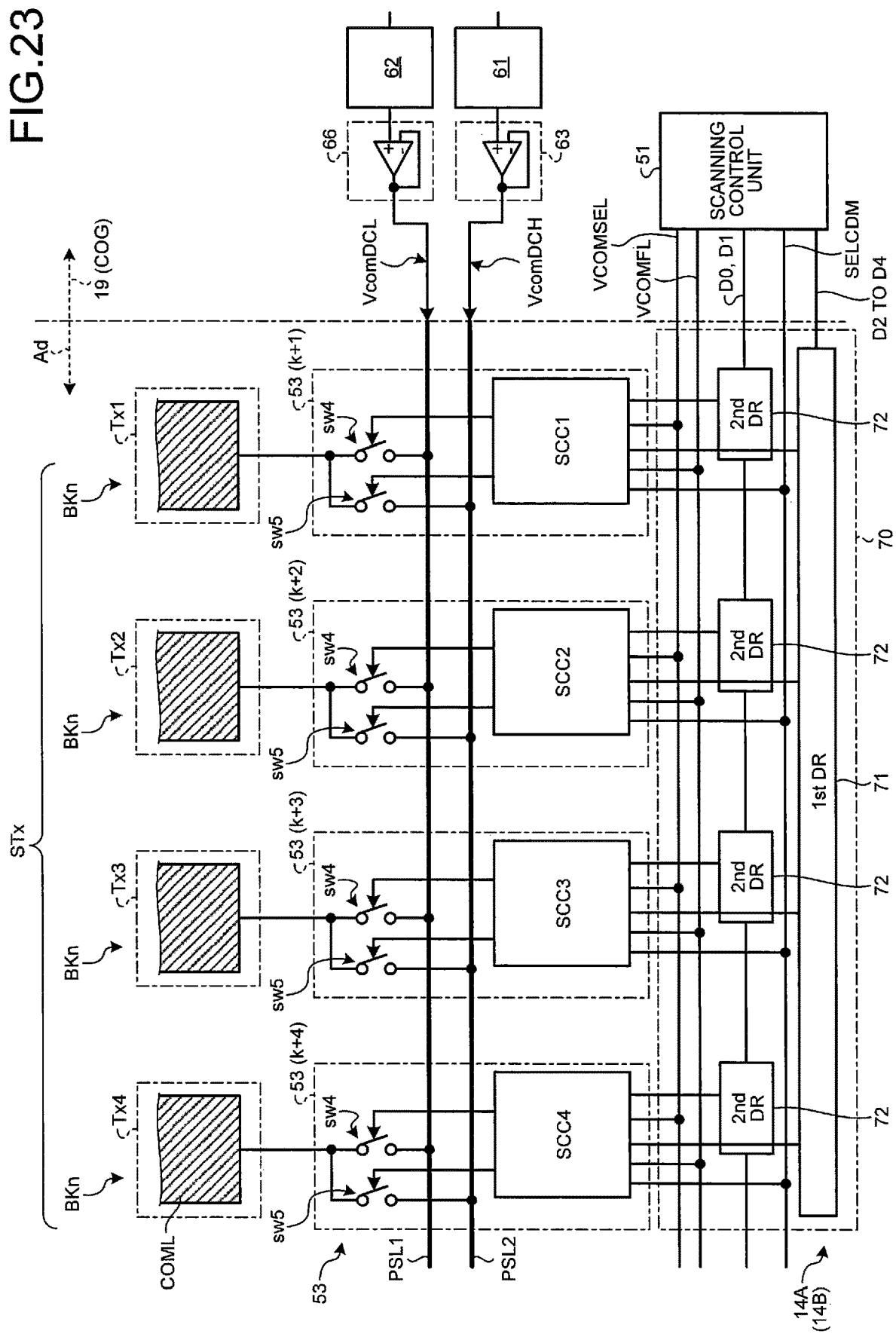
FIG. 23 is a block diagram illustrating a drive electrode driver according to a third embodiment.
Figure 25:
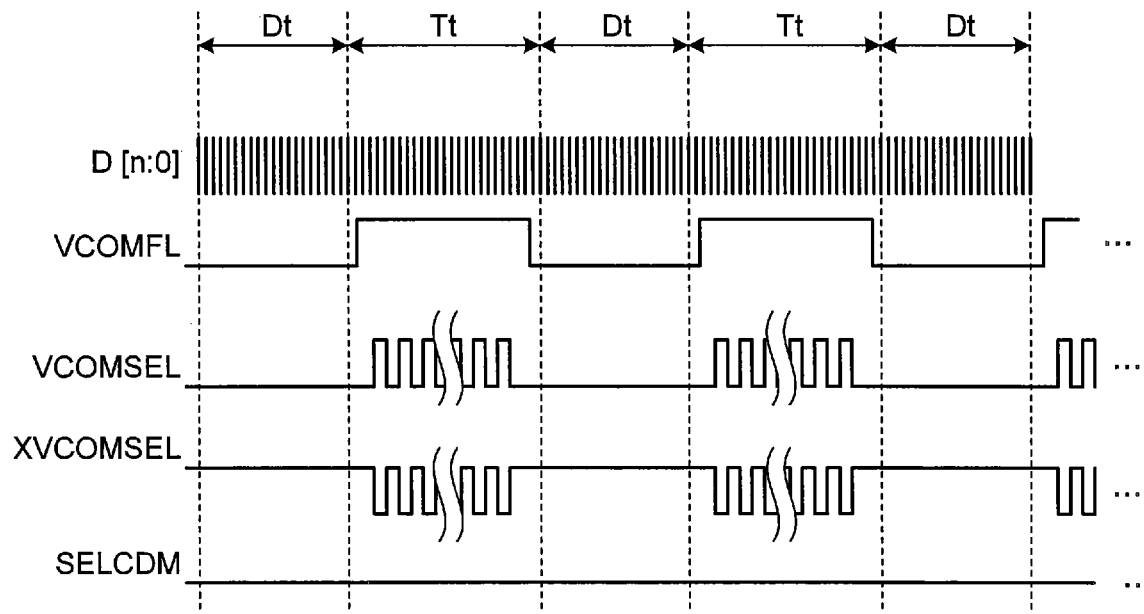
FIG. 25 is an explanatory diagram illustrating an example of a timing waveform of the display device with a touch detection function according to the third embodiment.
Figure 26:
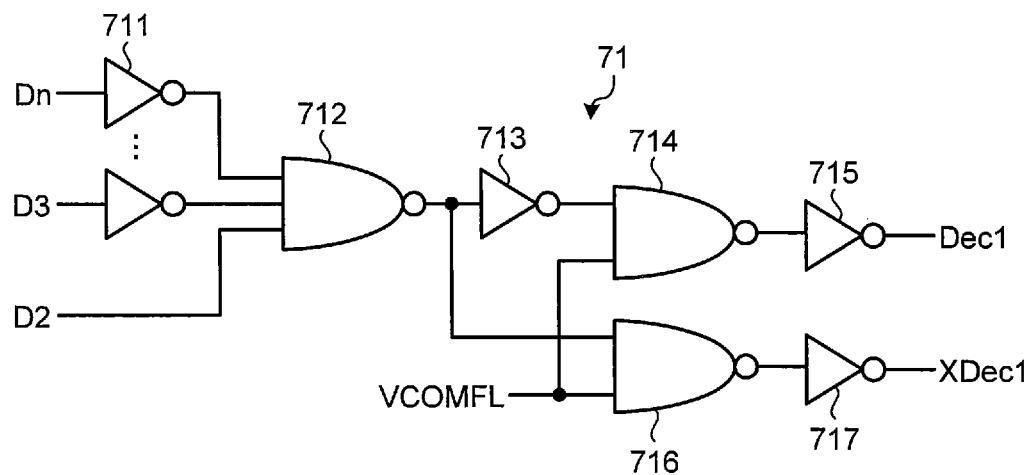
FIG. 26 is a block diagram illustrating a first scanning signal output circuit according to the third embodiment.
Figure 27:
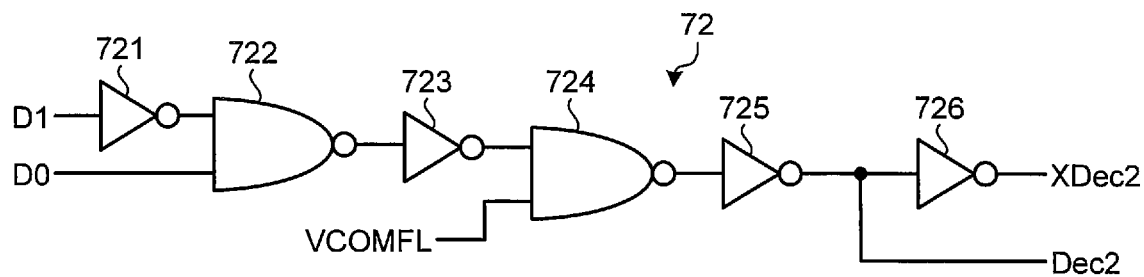
FIG. 27 is a block diagram illustrating a second scanning signal output circuit according to the third embodiment.
Figure 28:
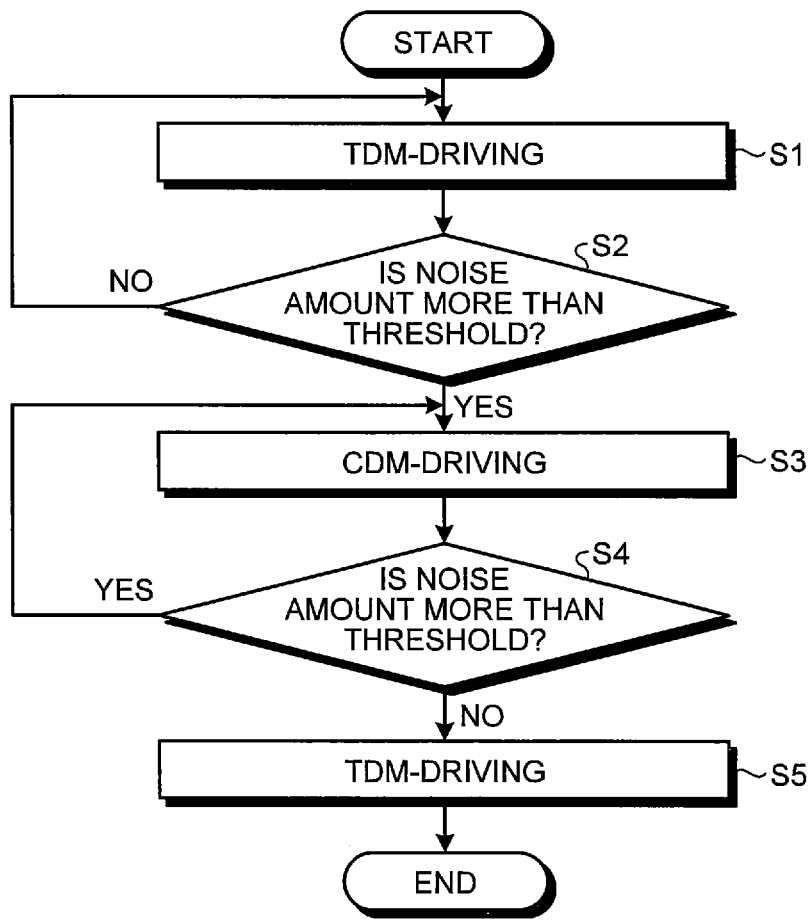
FIG. 28 is a flowchart illustrating a touch detection operation of the display device with a touch detection function according to the third embodiment.
Figure 29:
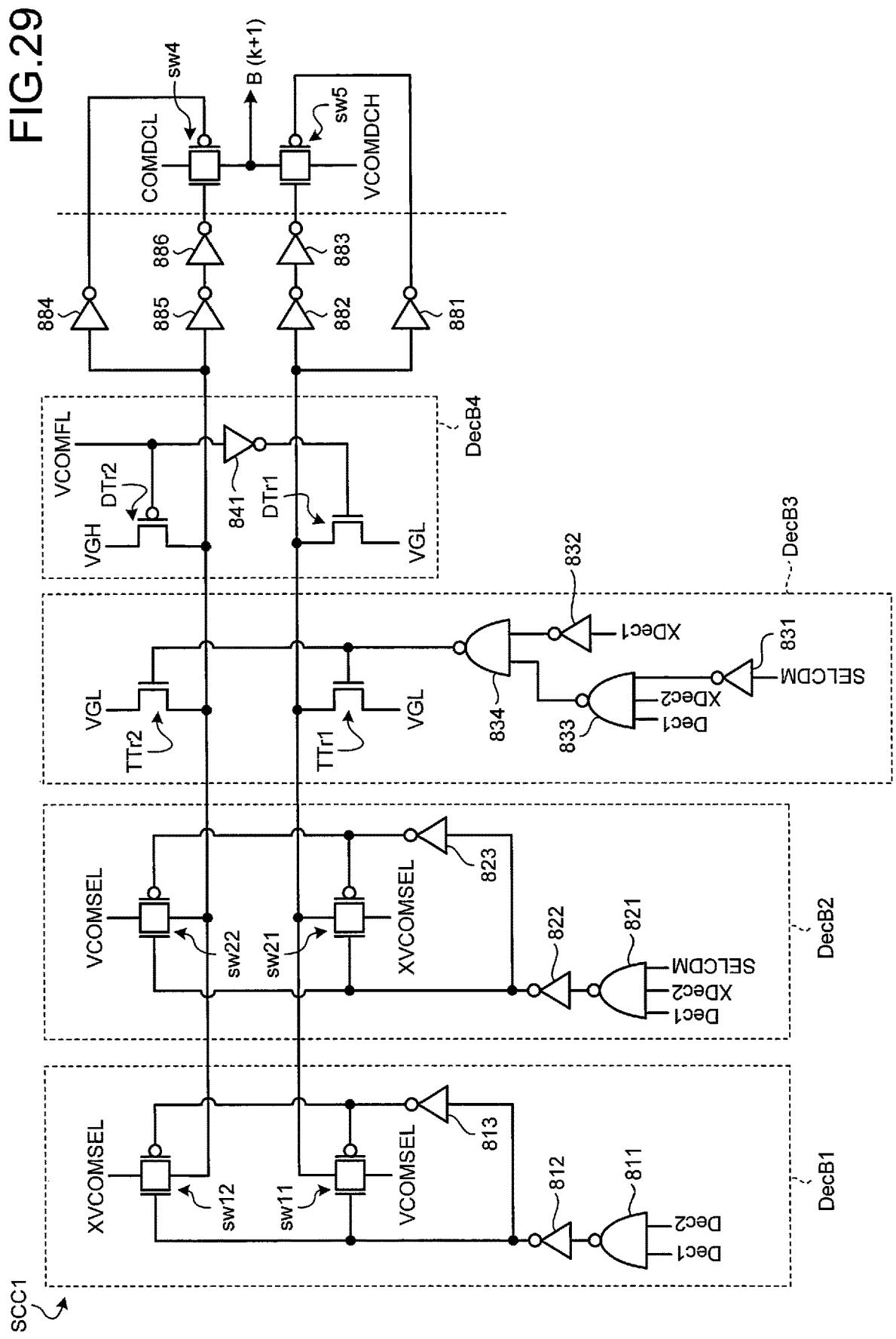
FIG. 29 is a block diagram illustrating a drive circuit of the display device with a touch detection function according to the third embodiment.

The following describes the display device with a touch detection function 1 according to a third embodiment. FIG. 23 is a block diagram illustrating the drive electrode driver according to the third embodiment. FIG. 24 is an explanatory diagram illustrating an example of the control signal of the drive electrode scanning unit according to the third embodiment. FIG. 25 is an explanatory diagram illustrating an example of the timing waveform of the display device with a touch detection function according to the third embodiment. FIG. 26 is a block diagram illustrating the first scanning signal output circuit according to the third embodiment. FIG. 27 is a block diagram illustrating the second scanning signal output circuit according to the third embodiment. FIG. 28 is a flowchart illustrating the touch detection operation of the display device with a touch detection function according to the third embodiment. FIG. 29 is a block diagram illustrating the drive circuit of the display device with a touch detection function according to the third embodiment. Although FIG. 23 to FIG. 29 illustrate the drive electrode driver of the first gate driver 12A, the configuration of the second gate driver 12B is substantially the same.

The high-level voltage generator 61 generates a high-level voltage VcomDCH of the touch driving signal VcomAC to be supplied to the second power supply wiring PSL2 via the buffer 63. The low-level voltage generator 62 generates a DC voltage of the display driving voltage VcomDC to be supplied to the second power supply wiring PSL2 via the buffer 66. The voltage generated by the low-level voltage generator 62 is also used as a low-level voltage VcomDCL of the touch driving signal VcomAC supplied to the second power supply wiring PSL2 via the buffer 63.

A touch detection scanning unit 70 includes a first scanning signal output circuit 71 that simultaneously selects a plurality of drive electrodes, and a second scanning signal output circuit 72. The first scanning signal output circuit 71 includes a decoder 1stDR, and generates scanning signals Dec1 (Xdec1) . . . described later for selecting the drive electrode COML to which the touch driving signal VcomAC is applied. Specifically, the touch detection scanning unit 70 sequentially determines a combination of inputs of 3-bit signals of scanning input signals D2 to D4 supplied to the decoder 1stDR from the scanning control unit 51 based on a determination table exemplified in FIG. 24, and generates the scanning signals Dec1 (Xdec1) . . . . The selected shift register 1stDR sends out the scanning signals Dec1 (Xdec1) . . . to each of switching circuits SCC1, SCC2, SCC3, and SCC4 of the driving units 53.

The driving unit 53 includes the switching circuits SCC1, SCC2, SCC3, or SCC4, and the selection switches sw4 and sw5 for each drive electrode block B. An operation of the selection switch sw4 is controlled based on the signal supplied from the switching circuits SCC1, SCC2, SCC3, or SCC4. An end of the selection switch sw4 is coupled to the drive electrodes COML included in the drive electrode block B, and the other end of the selection switch sw4 is coupled to the first power supply wiring PSL1. An operation of the selection switch sw5 is controlled based on the signal supplied from the switching circuits SCC1, SCC2, SCC3, or SCC4. An end of the selection switch sw5 is coupled to the drive electrodes COML included in the drive electrode block B, and the other end of the selection switch sw5 is coupled to the second power supply wiring PSL2.

The second scanning signal output circuit 72 includes a decoder 2ndDR, and generates scanning signals that select any one of the drive electrodes Tx1, Tx2, Tx3, and Tx4 that invert the phase of the touch driving signal VcomAC in order to apply the touch driving signals VcomAC to the selection drive electrode block BKn selected by the first scanning signal output circuit 71. Specifically, the second scanning signal output circuit 72 sequentially determines a combination of inputs of 2-bit signals of scanning input signals D0 and D1 supplied to the decoder 2ndDR from the scanning control unit 51 based on the determination table exemplified in FIG. 24, and generates the scanning signals Dec2 (XDec2) . . . .

As illustrated in FIG. 26, the first scanning signal output circuit 71 includes inverters 711, 713, 715, and 717, and NAND circuits 712, 714, and 716. The scanning input signals D2 to Dn (n=4 in the third embodiment) and a touch detection enabling pulse VCOMFL are input to the first scanning signal output circuit 71. As illustrated in FIG. 26, the first scanning signal output circuit 71 generates the scanning signals Dec1 (Xdec1) . . . from the scanning input signals D2 to Dn (n=4 in the third embodiment) and the touch detection enabling pulse VCOMFL based on the determination table illustrated in FIG. 24. As illustrated in FIG. 25, the drive electrode selection signal VCOMSEL is an AC rectangular wave having a certain frequency. As illustrated in FIG. 25, the drive electrode selection signal XVCOMSEL is an inverted waveform of the AC rectangular wave of the drive electrode selection signal VCOMSEL. As will be described later, a mode switching signal SELCDM illustrated in FIG. 25 is a control signal that performs CDM-driving at a high level and performs TDM-driving at a low level.

As illustrated in FIG. 27, the second scanning signal output circuit 72 includes inverters 721, 723, 725, and 726, and NAND circuits 722 and 724. The scanning input signals D0 to D1 and the touch detection enabling pulse VCOMFL are input to the second scanning signal output circuit 72. As illustrated in FIG. 27, the second scanning signal output circuit 72 generates scanning signals Dec2 (XDec2) . . . from the scanning input signals D0 and D1 and the touch detection enabling pulse VCOMFL based on the determination table illustrated in FIG. 24.

As described above, in the display device with a touch detection function 1 according to the third embodiment, the detection sensitivity for touch detection is increased, touch detection accuracy is improved, and the touch detection can be performed in a short time by performing the CDM-driving. However, in the display device with a touch detection function 1 according to the third embodiment, electrical power that is supplied to the first power supply wiring PSL1 and the second power supply wiring PSL2 should be increased to drive a plurality of drive electrode blocks. Accordingly, the display device with a touch detection function 1 according to the third embodiment can switch the TDM-driving and the CDM-driving described above.

As illustrated in FIG. 28, the display device with a touch detection function 1 according to the third embodiment processes the TDM-driving (Step S1). As illustrated in FIG. 29, the following describes the switching circuit SCC1 among the switching circuits SCC1, SCC2, SCC3, and SCC4 included in the driving unit 53. The configuration of each of the switching circuits SCC2, SCC3, and SCC4 is the same as that of the switching circuit SCC1, and a description thereof will not be provided.

The switching circuit SCC1, for example, includes circuit blocks DecB1, DecB2, DecB3, and DecB4, and operates the selection switches sw4 and sw5 via inverters 881 to 886. In the switching circuit SCC1, the circuit block DecB1, DecB2, DecB3, or DecB4 operates the selection switches sw4 and sw5 based on a truth-value table illustrated in FIG. 30. As a result, the selection switches sw4 and sw5 may perform switching operation based on the drive electrode selection signal VCOMSEL in some cases. The selection switches sw4 and sw5 may perform switching operation based on the drive electrode selection signal XVCOMSEL in some cases. The selection switches sw4 and sw5 may cause a floating state in which the selection switches sw4 and sw5 are not coupled to the drive electrode block Tx1 and the electric potential of the drive electrode block Tx1 is not fixed. The selection switches sw4 and sw5 may supply only a fixed electric potential (COMDCL) to the drive electrode block Tx1 in some cases.

The circuit block DecB1 includes a NAND circuit 811, inverters 812 and 813, and switches sw11 and sw12. The circuit block DecB1 is a circuit that operates when the scanning signal Dec1 and the scanning signal Dec2 are input.

The circuit block DecB2 includes a NAND circuit 821, inverters 822 and 823, and switches sw21 and sw22. The circuit block DecB2 is a circuit that operates when the scanning signal Dec1 and the scanning signal XDec2 are input.

The circuit block DecB3 includes NAND circuits 833 and 834, inverters 831 and 833, and transistors TTr1 and TTr2. The circuit block DecB3 is a circuit that operates in the floating state described above when the scanning signal XDec1 and the scanning signal XDec2 are input. The circuit block DecB3 is a circuit that operates in the floating state described above when the scanning signal XDec2 and the mode switching signal SELCDM are input at a low level even if the scanning signal Dec1 is input.

The circuit block DecB4 includes an inverter 841 and transistors DTr1 and DTr2. The circuit block DecB4 is a circuit that supplies only a fixed electric potential (COM-DCL) to the drive electrode block Tx1 described above when the liquid crystal display unit 20 performs display operation (in a case in which the touch detection enabling pulse VCOMFL is low level (L)).

As described above, for example, the switching circuit SCC1 includes the circuit blocks DecB1, DecB2, DecB3, and DecB4, and operates the selection switches sw4 and sw5 via the inverters 881 to 886. Accordingly, for example, the number of gates through which the drive electrode selection signal VCOMSEL passes is reduced, so that it is possible to suppress gate delay amount of the drive electrode selection signal VCOMSEL.

In Step S1 described above, the mode switching signal SELCDM is "L". Accordingly, the first scanning signal output circuit 71 inputs the scanning signal Dec1, the Dec1 becomes "H", and the four drive electrode blocks Tx1 to Tx4 are selected, for example. Another first scanning signal output circuit 71 inputs the scanning signal XDec1, and another drive electrode block is caused to be in the floating state. In the four drive electrode blocks Tx1 to Tx4, the second scanning signal output circuit 72 sequentially inputs the scanning signal Dec2, the Dec2 becomes "H", and the driving signal VcomAC corresponding to VCOMSEL is output. The driving signal VcomAC is transmitted to the touch detection electrode TDL via capacitance, and the touch detection signal Vdet is changed.

When the liquid crystal display unit 20 performs display operation, in the driving unit 53, the scanning signal SRout is low level, entire wiring is coupled to the first power supply wiring PSL1 via one selection switch sw5 for each drive electrode block B, and the display driving voltage VcomDC is output as the driving signal Vcom. The display device with a touch detection function 1 according to the third embodiment supplies the driving signal Vcom (the display driving voltage VcomDC and the driving signal VcomAC) to the drive electrode COML in a time division manner, in the touch detection operation (touch detection operation period Tt) and in the display operation (display period Dt), separately.

As illustrated in FIG. 28, the control unit 11 continues Step S1 when noise included in the touch detection signal Vdet is equal to or less than a threshold (No at Step S2). As illustrated in FIG. 28, the control unit 11 executes Step S3 when the noise included in the touch detection signal Vdet is more than the threshold (Yes at Step S2). The control unit 11 causes the gate driver 14 to process the CDM-driving (Step S3). In the display device with a touch detection function 1 according to the third embodiment, the detection sensitivity for touch detection is increased, touch detection accuracy is improved, and the touch detection can be performed in a short time by performing the CDM-driving.

The scanning signal XDec2 supplied from the second scanning signal output circuit 72 is output based on the code of the diagonal component "−1" in the square matrix of the equation (1) described above. The code "−1" is a code for supplying the touch driving signal VcomAC of which phase is determined to be different from that of the code "1". Accordingly, an AC rectangular wave having a certain frequency corresponding to the drive electrode selection signal VCOMSEL is applied to any three of the drive electrode block Tx1 to the drive electrode block Tx4, and an inverted waveform of the AC rectangular wave of the drive electrode selection signal VCOMSEL corresponding to the drive electrode selection signal XVCOMSEL is applied to remaining one of the drive electrode block Tx1 to drive electrode block Tx4. Timing of applying the inverted waveform of the AC rectangular wave of the drive electrode selection signal VCOMSEL corresponding to the drive electrode selection signal XVCOMSEL is shifted for each of the drive electrode block Tx1 to the drive electrode block Tx4.

As illustrated in FIG. 28, the control unit 11 continues Step S3 when noise included in the touch detection signal Vdet is more than a threshold (Yes at Step S4). As illustrated in FIG. 28, the control unit 11 executes Step S5 when the noise included in the touch detection signal Vdet is equal to or less than the threshold (No at Step S4).

The display device with a touch detection function 1 according to the third embodiment performs TDM-driving (Step S5). Accordingly, in the display device with a touch detection function 1 according to the third embodiment, it is possible to suppress power consumption for touch detection.

The display device with a touch detection function 1 according to the third embodiment may supply the driving signal Vcom (the display driving voltage VcomDC and the driving signal VcomAC) to the drive electrode COML in a time division manner in one display horizontal period, in a plurality of touch detection operations (touch detection operation periods Tt) and in a plurality of display operations (display periods Dt), separately. The display device with a touch detection function 1 according to the third embodiment may supply the driving signal Vcom (the display driving voltage VcomDC and the driving signal VcomAC) to the drive electrode COML in a time division manner in one display horizontal period, in the touch detection operation (touch detection operation period Tt) and in the display operation (display period Dt), separately. The display device with a touch detection function 1 according to the third embodiment may process display operations for a plurality of horizontal periods in one display period Dt, in the touch detection operation (touch detection operation period Tt) and in the display operation (display period Dt), separately.

As described above, the display device with a touch detection function 1 according to the third embodiment routes, to the frame region, the first power supply wiring PSL1 that supplies the display driving voltage VcomDC to the drive electrode COML and the second power supply wiring PSL2 that supplies the touch driving signal VcomAC to the drive electrode COML. With only two pieces of power supply wiring routed to the frame region, that is, the first power supply wiring PSL1 and the second power supply wiring PSL2, it is possible to drive the drive electrode blocks of which number is equal to or larger than the number of pieces of the first power supply wiring PSL1 and the second power supply wiring PSL2.

For example, when the first power supply wiring PSL1 and the second power supply wiring PSL2 are arranged along a plane parallel to the surface of the TFT substrate 21, parasitic capacity should be considered. In the drive electrode block B arranged at a position away from the COG 19 (driving signal generation unit), transition time of a pulse of the driving signal VcomAC may be increased. Therefore, it is effective that a wiring width is widened, for example about 100 μm to 200 μm, to lower resistance in the first power supply wiring PSL1 and the second power supply wiring PSL2. Accordingly, even when a plurality of drive electrode blocks are simultaneously selected and CDM-driven, the number of pieces of power supply wiring routed to the frame region is only two, that is, the first power supply wiring PSL1 and the second power supply wiring PSL2, and a width Gdv of the frame Gd illustrated in FIG. 7 can be suppressed. As a result, the display device with a touch detection function 1 according to the third embodiment can suppress the possibility that the transition time of the pulse of the driving signal VcomAC is increased in the drive electrode block B arranged in the vicinity of a terminal part of the second power supply wiring PSL2.

As described above, in the display device with a touch detection function 1 according to the third embodiment, when the drive electrode scanning unit 14A (14B) simultaneously selects two or more drive electrode blocks of which number is equal to the number of pieces of the power supply wiring, the drive electrode driver 14 supplies the waveform VCOMSEL and the inverted waveform XVCOM of the touch driving signal VcomAC of which phase is determined based on the certain code (for example, the code of the square matrix illustrated in the equation (1) described above) to the selected drive electrode. In the display device with a touch detection function according to the third embodiment, the detection sensitivity for touch detection is increased, touch detection accuracy is improved, and the touch detection can be performed in a short time. Herein, the certain code is not limited to the code in the square matrix illustrated in the equation (1) described above.

Figure 31:
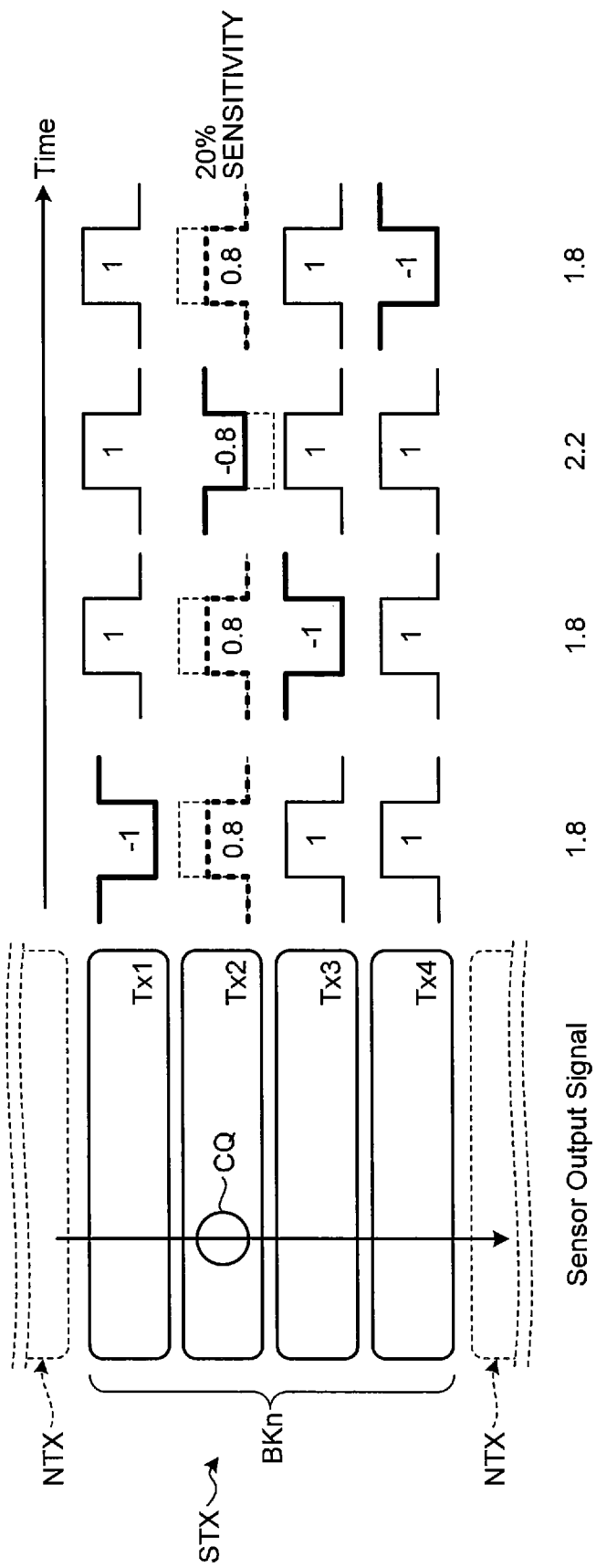
FIG. 31 is an explanatory diagram illustrating another operation example of code-division multiplexed driving in the display device with a touch detection function according to the third embodiment.

FIG. 31 is an explanatory diagram illustrating another operation example of code-division multiplexed driving in the display device with a touch detection function according to the third embodiment. As illustrated in FIG. 31, in the display unit with a touch detection function 10, the drive electrode driver 14 simultaneously selects the four drive electrode blocks Tx1, Tx2, Tx3, and Tx4 of the selection drive electrode block BKn and supplies the touch driving signal VcomAC of which phase is determined based on a certain code. The certain code is, for example, defined by a square matrix of an equation (2) described below, and the degree of the square matrix is four, which is the number of the drive electrode blocks Tx1, Tx2, Tx3, and Tx4 of the selection drive electrode block BKn. In the square matrix of the equation (2) described below, a code in one column among a plurality of codes included in each row is "−1", and all the codes in other columns of the row are "1". In the square matrix of the equation (2) described below, the code "−1" included in each column is equally distributed to each column. The drive electrode driver 14 applies the touch driving signal VcomAC based on the square matrix of the equation (2) described below so that the phase of the AC rectangular wave Sg corresponding to the component "1" other than the diagonal component of the square matrix and the phase of the AC rectangular wave Sg corresponding to the code "−1" of the square matrix are inverted.

The scanning signal XDec2 supplied from the second scanning signal output circuit 72 is output based on the code "−1" in the square matrix of the equation (2) described below. The code "−1" is a code for supplying the touch driving signal VcomAC of which phase is determined to be different from that of the code "1". Accordingly, an AC rectangular wave having a certain frequency corresponding to the drive electrode selection signal VCOMSEL is applied to any three of the drive electrode block Tx1 to the drive electrode block Tx4, and an inverted waveform of the AC rectangular wave of the drive electrode selection signal VCOMSEL corresponding to the drive electrode selection signal XVCOMSEL is applied to remaining one of the drive electrode block Tx1 to drive electrode block Tx4. Timing of applying the inverted waveform of the AC rectangular wave of the drive electrode selection signal VCOMSEL corresponding to the drive electrode selection signal XVCOMSEL is shifted for each of the drive electrode block Tx1 to the drive electrode block Tx4 corresponding to the code "−1" in the square matrix of the equation (2) described below.

When there is an object CQ approaching from the outside such as a finger at the drive electrode block Tx2 that is the second position from an upstream side of the scanning direction of the drive electrode blocks Tx1, Tx2, Tx3, and Tx4 of the selection drive electrode block BKn, a difference voltage is caused by the object CQ approaching from the outside due to mutual induction (for example, the difference voltage is 20%). The touch detection signal (sensor output signal) detected by the touch detection unit 40 in a first time period is (−1)+(0.8)+(1)+(1)=1.8. The touch detection signal (sensor output signal) detected by the touch detection unit 40 in a second time period is (1)+(0.8)+(−1)+(1)=1.8. The touch detection signal (sensor output signal) detected by the touch detection unit 40 in a third time period is (1)+(−0.8)+(1)+(1)=2.2. The touch detection signal (sensor output signal) detected by the touch detection unit 40 in a fourth time period is (1)+(0.8)+(1)+(−1)=1.8.

The coordinate extractor 45 multiplies the touch detection signals detected by the signal processor 44 by the square matrix of the equation (2) below, and detects that there is the object CQ approaching from the outside such as a finger at a position of the drive electrode block Tx2 of the selection drive electrode block BKn with detection sensitivity that is four times that of the time-division multiplexed (TDM) driving, without increasing the voltage. Then the coordinate extractor 45 outputs the touch panel coordinates as a signal output Vout.

Equation 2

$$\begin{pmatrix} -1 & 1 & 1 & 1 \\ 1 & 1 & -1 & 1 \\ 1 & -1 & 1 & 1 \\ 1 & 1 & 1 & -1 \end{pmatrix} \begin{pmatrix} 1.8 \\ 1.8 \\ 2.2 \\ 1.8 \end{pmatrix} = \begin{pmatrix} 4.0 \\ 3.2 \\ 4.0 \\ 4.0 \end{pmatrix} \qquad (2)$$

In the display device with a touch detection function 1 according to the third embodiment, the detection sensitivity for touch detection is increased, touch detection accuracy is improved, and the touch detection can be performed in a short time.

1-4. Other Modifications

Hereinabove, although some embodiments and modifications are exemplified, the present disclosure is not limited to the embodiments and the like and can be variously modified.

Figure 32:
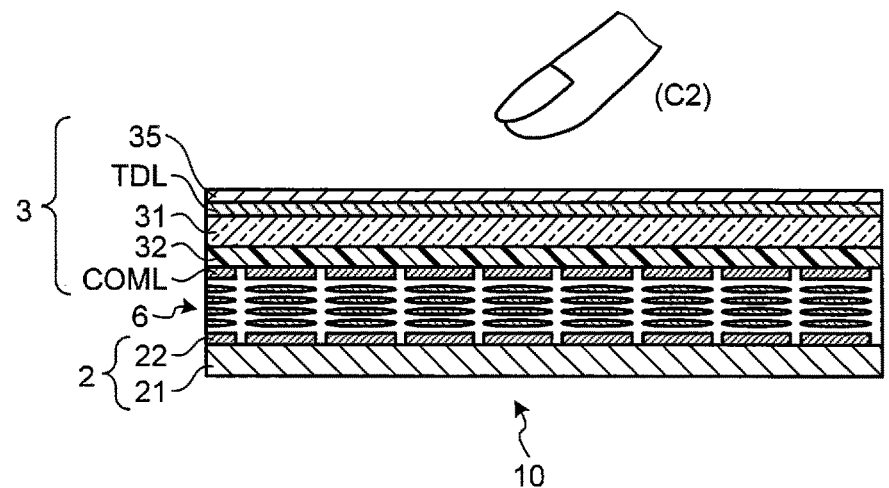
FIG. 32 is a cross-sectional view illustrating a schematic cross-sectional structure of the display unit with a touch detection function according to a modification.

In the display device with a touch detection function 1 according to the embodiments and the modifications described above, the touch detection device 30 may be integrated with the liquid crystal display unit 20 containing liquid crystals in various modes such as the FFS mode and the IPS mode to be the display unit with a touch detection function 10. FIG. 32 is a cross-sectional view illustrating a schematic cross-sectional structure of the display unit with a touch detection function according to the modification. Alternatively, in the display unit with a touch detection function 10 according to the modification illustrated in FIG.

31, the touch detection device may be integrated with a liquid crystal in various modes such as the twisted nematic (TN) mode, the vertical alignment (VA) mode, and the electrically controlled birefringence (ECB) mode.

As illustrated in FIG. 32, when the counter substrate 3 includes the drive electrode COML, the second power supply wiring PSL2 and the first power supply wiring PSL1 may be provided to the counter substrate 3. With this structure, a distance between the drive electrode COML and the second power supply wiring PSL2 (first power supply wiring PSL1) becomes short. Similarly to the first, second, and third embodiments described above, the scanning line GCL included in the TFT substrate 21 three-dimensionally intersect the second power supply wiring PSL2 and the first power supply wiring PSL1. As a result, the second power supply wiring PSL2 is arranged in the frame region Gd positioned outside the display region Ad in the direction vertical to the TFT substrate 21.

The above-described embodiments describe what is called an in-cell type apparatus in which the liquid crystal display unit 20 is integrated with the capacitive touch detection device 30, however, the present disclosure is not limited thereto. Alternatively, it can be an on-cell type apparatus to which the liquid crystal display unit 20 and the capacitive touch detection device 30 are mounted, for example. In a case of the on-cell type apparatus, the drive electrode COML of the pixel substrate 2 illustrated in FIG. 8 is a first drive electrode COML, a second drive electrode COML is additionally provided on a surface of the glass substrate 31 in the counter substrate 3, and the first drive electrode COML and the second drive electrode COML are electrically coupled to each other. Also in this case, with a configuration as described above, touch detection can be performed while suppressing influence of external noise or noise transmitted from the liquid crystal display unit (corresponding to internal noise in the embodiments described above).

2. Application Example

With reference to FIG. 33 to FIG. 45, the following describes application examples of the display device with a touch detection function 1 described in the embodiments and the modifications thereof. FIG. 33 to FIG. 45 are diagrams illustrating examples of an electronic apparatus to which the display device with a touch detection function according to any one of the embodiments and the modifications thereof is applied. The display device with a touch detection function 1 according to any one of the first, the second, and the third embodiments and the modifications thereof can be applied to electronic apparatuses in various fields such as television apparatuses, digital cameras, notebook-type personal computers, portable information devices such as cellular telephones, and video cameras. In other words, the display device with a touch detection function 1 according to any one of the first, the second, and the third embodiments and the modifications thereof can be applied to the electronic apparatuses in various fields that display a video signal input from the outside or a video signal generated inside as an image or a video.

Application Example 1

Figure 33:
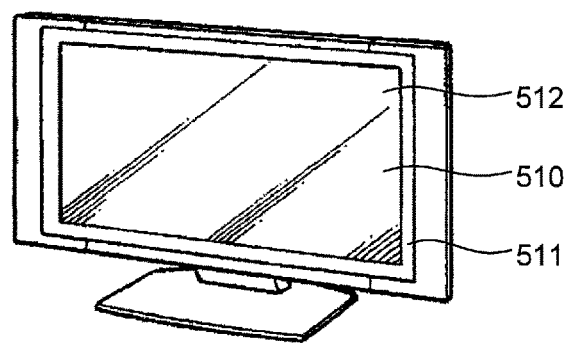
FIG. 33 is a diagram illustrating an example of an electronic apparatus to which the display device with a touch detection function according to any one of the embodiments and the modifications thereof is applied.

An electronic apparatus illustrated in FIG. 33 is a television apparatus to which the display device with a touch detection function 1 according to any one of the first, the second, and the third embodiments and the modifications thereof is applied. For example, the television apparatus includes a video display screen unit 510 including a front panel 511 and a filter glass 512, and the video display screen unit 510 is the display device with a touch detection function according to any one of the first, the second, and the third embodiments and the modifications thereof.

Application Example 2

Figure 34:
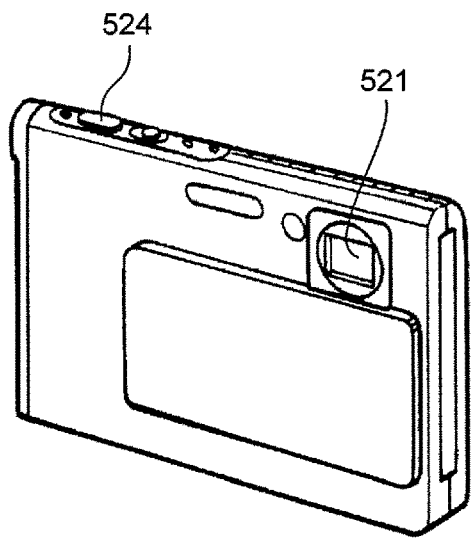
FIG. 34 is a diagram illustrating an example of an electronic apparatus to which the display device with a touch detection function according to any one of the embodiments and the modifications thereof is applied.
Figure 35:
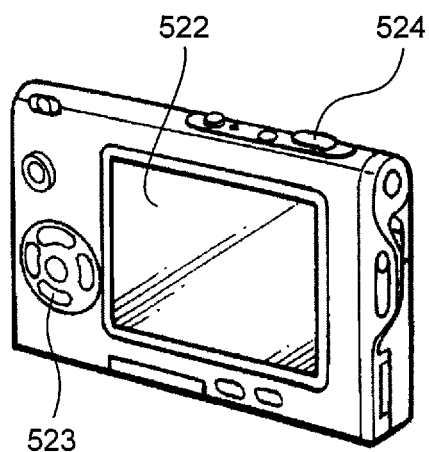
FIG. 35 is a diagram illustrating the example of an electronic apparatus to which the display device with a touch detection function according to any one of the embodiments and the modifications thereof is applied

An electronic apparatus illustrated in FIG. 34 and FIG. 35 is a digital camera to which the display device with a touch detection function 1 according to any one of the first, the second, and the third embodiments and the modifications thereof is applied. For example, the digital camera includes a flash light emitting unit 521, a display unit 522, a menu switch 523, and a shutter button 524. The display unit 522 is the display device with a touch detection function according to any one of the first, the second, and the third embodiments and the modifications thereof.

Application Example 3

Figure 36:
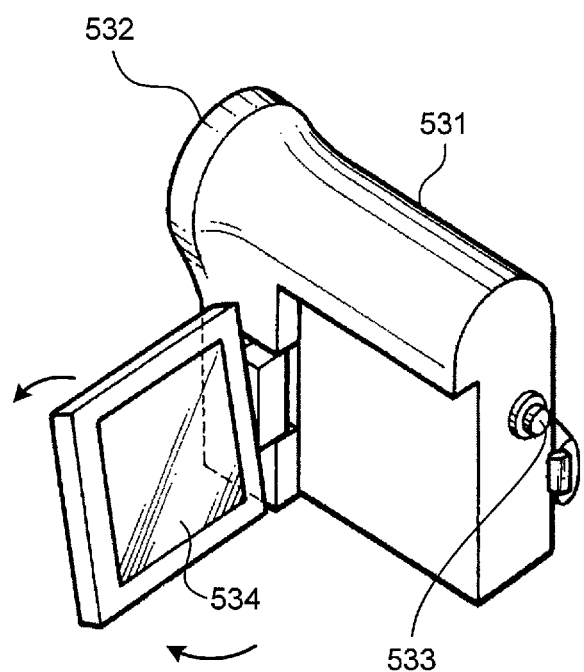
FIG. 36 is a diagram illustrating an example of an electronic apparatus to which the display device with a touch detection function according to any one of the embodiments and the modifications thereof is applied.

An electronic apparatus illustrated in FIG. 36 represents an external appearance of a video camera to which the display device with a touch detection function 1 according to any one of the first, the second, and the third embodiments and the modifications thereof is applied. For example, the video camera includes a main body part 531, a lens 532 for photographing a subject provided at a front side of the main body part 531, a start/stop switch 533 for photography, and a display unit 534. The display unit 534 is the display device with a touch detection function according to any one of the first, the second, and the third embodiments and the modifications thereof.

Application Example 4

Figure 37:
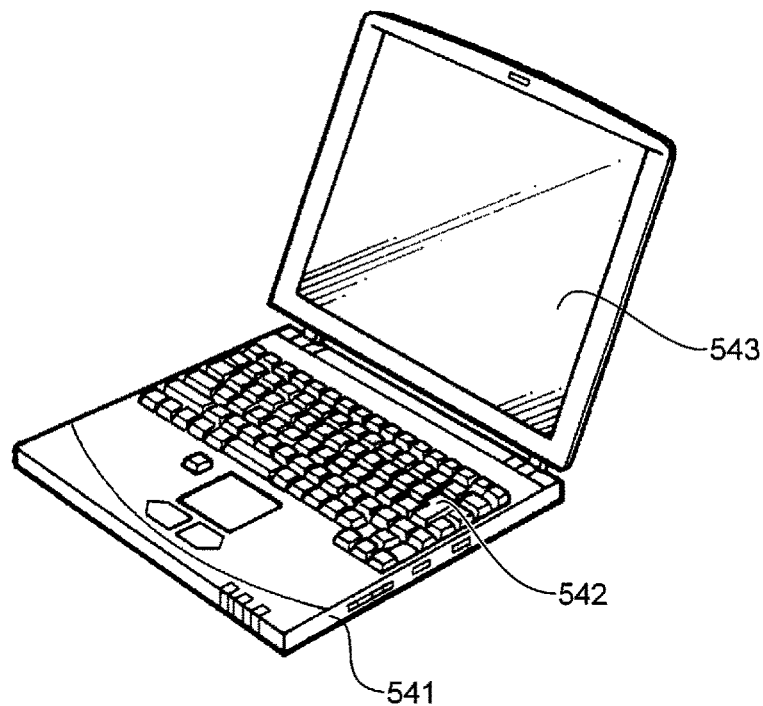
FIG. 37 is a diagram illustrating an example of an electronic apparatus to which the display device with a touch detection function according to any one of the embodiments and the modifications thereof is applied.
Figure 38:
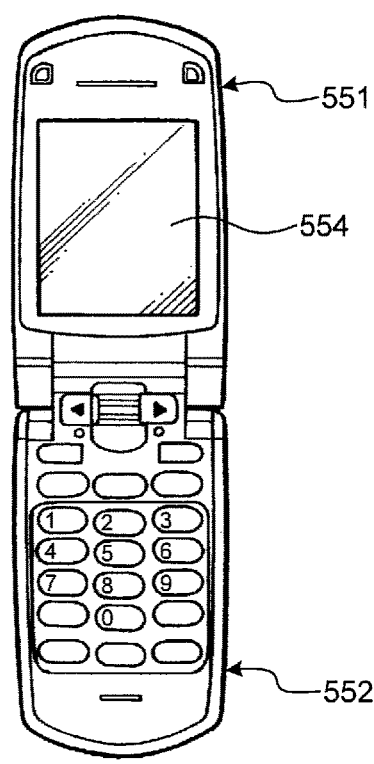
FIG. 38 is a diagram illustrating an example of an electronic apparatus to which the display device with a touch detection function according to any one of the embodiments and the modifications thereof is applied.
Figure 39:
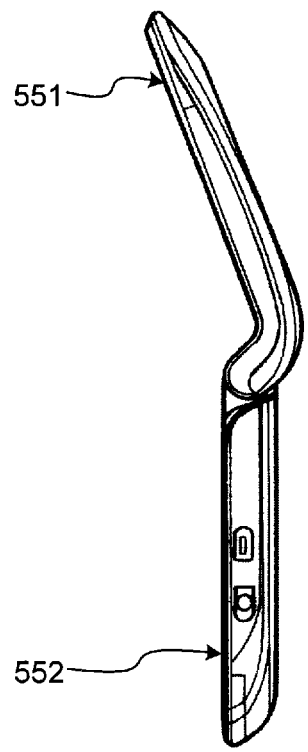
FIG. 39 is a diagram illustrating the example of an electronic apparatus to which the display device with a touch detection function according to any one of the embodiments and the modifications thereof is applied.
Figure 40:
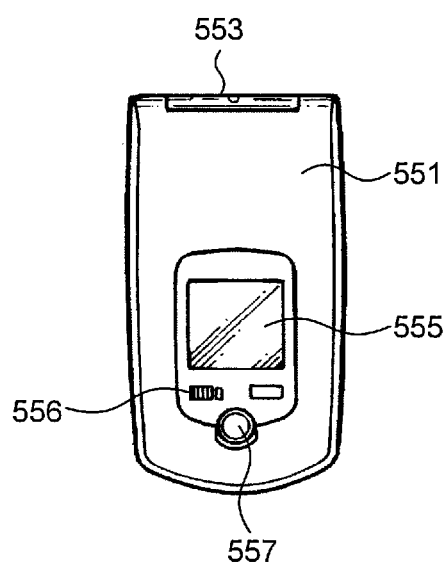
FIG. 40 is a diagram illustrating the example of an electronic apparatus to which the display device with a touch detection function according to any one of the embodiments and the modifications thereof is applied.
Figure 41:
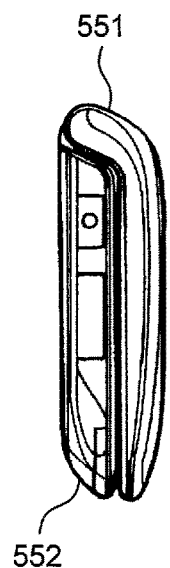
FIG. 41 is a diagram illustrating the example of an electronic apparatus to which the display device with a touch detection function according to any one of the embodiments and the modifications thereof is applied.
Figure 42:
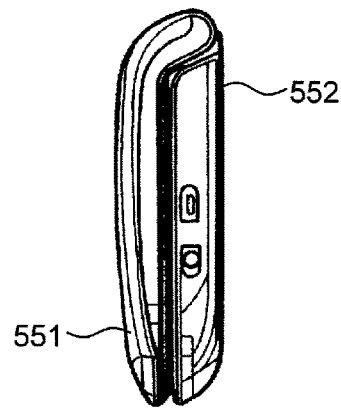
FIG. 42 is a diagram illustrating the example of an electronic apparatus to which the display device with a touch detection function according to any one of the embodiments and the modifications thereof is applied.
Figure 43:
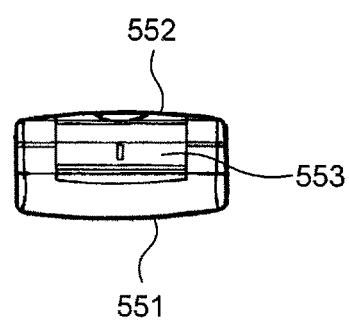
FIG. 43 is a diagram illustrating the example of an electronic apparatus to which the display device with a touch detection function according to any one of the embodiments and the modifications thereof is applied.
Figure 44:
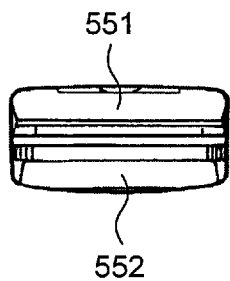
FIG. 44 is a diagram illustrating the example of an electronic apparatus to which the display device with a touch detection function according to any one of the embodiments and the modifications thereof is applied.

An electronic apparatus illustrated in FIG. 37 is a notebook-type personal computer to which the display device with a touch detection function 1 according to any one of the first, the second, and the third embodiments and the modifications thereof is applied. For example, the notebook-type personal computer includes a main body 541, a keyboard 542 for input operation of characters and the like, and a display unit 543 that displays an image. The display unit 543 is the display device with a touch detection function according to any one of the first, the second, and the third embodiments and the modifications thereof.

Application Example 5

An electronic apparatus illustrated in FIG. 38 to FIG. 44 is a mobile phone to which the display device with a touch detection function 1 according to any one of the first, the second, and the third embodiments and the modifications thereof is applied. For example, the mobile phone is made by connecting an upper housing 551 and a lower housing 552 with a connecting part (hinge part) 553, and includes a display device 554, a sub-display device 555, a picture light 556, and a camera 557. Each of the display device 554 and the sub-display device 555 is the display device with a touch detection function according to any one of the first, the second, and the third embodiments and the modifications thereof.

Application Example 6

Figure 45:
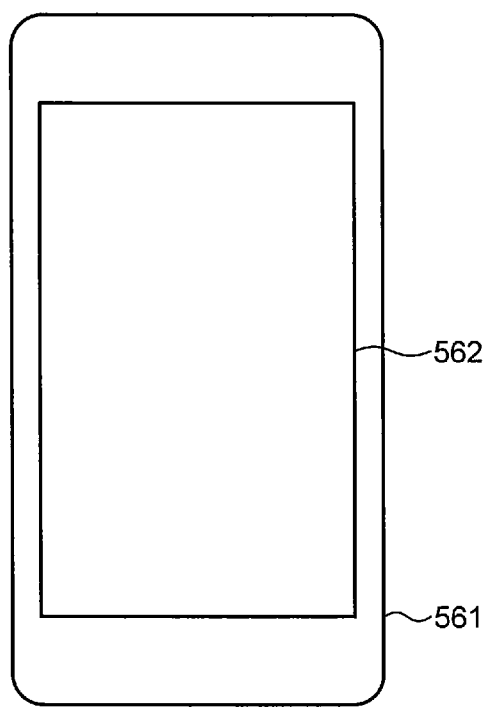
FIG. 45 is a diagram illustrating an example of an electronic apparatus to which the display device with a touch detection function according to any one of the embodiments and the modifications thereof is applied.

An electronic apparatus illustrated in FIG. 45 is a portable information terminal that operates as a mobile computer, a multifunctional mobile phone, a mobile computer allowing voice communication, or a mobile computer allowing communication, and may be called a smart phone or a tablet terminal in some cases. For example, the portable information terminal includes a display unit 562 on a surface of a housing 561. The display unit 562 is the display device with a touch detection function 1 according to any one of the first, the second, and the third embodiments and the modifications thereof.

3. Aspects of Present Disclosure

The present disclosure includes aspects as follows.

(1) A display device with a touch detection function comprising:
a display region in which a plurality of pixel electrodes are arranged in a matrix;
a plurality of drive electrodes arranged opposed to the pixel electrodes;
a display functional layer having an image display function for displaying an image in the display region;
a control device that applies a display driving voltage between the pixel electrodes and the drive electrodes based on an image signal and performs image display control so that the image display function of the display functional layer is exhibited;
a touch detection electrode that is opposed to the drive electrodes and forms capacitance with respect to the drive electrodes;
a touch detection unit that detects a position of a proximity object based on a detection signal from the touch detection electrode;
power supply wiring arranged in a frame region positioned outside the display region; and
a plurality of drive electrode scanning units that select the drive electrode to be coupled to the power supply wiring based on a selection signal from the control device, wherein,
when first number that is number of the drive electrodes simultaneously selected by the drive electrode scanning unit is equal to or larger than second number that is number of pieces of the power supply wiring,
the control device supplies a touch driving signal of which phase is determined based on a certain code.

(2) The display device with a touch detection function according to (1), wherein
the drive electrode scanning unit comprises:
a first scanning signal output circuit that simultaneously selects the first number of the drive electrodes; and
a second scanning signal output circuit that outputs a scanning signal for determining the phase of the touch driving signal.

(3) The display device with a touch detection function according to (2), wherein
the power supply wiring comprises:
first power supply wiring that supplies a certain voltage; and
second power supply wiring that supplies a voltage having a certain waveform, and
at least one second scanning signal output circuit changes a phase of the certain waveform based on the certain code.

(4) The display device with a touch detection function according to (2), wherein
the power supply wiring comprises:
first power supply wiring that supplies a first voltage; and
second power supply wiring that supplies a second voltage, and the second scanning signal output circuit alternately repeats the first voltage and the second voltage based on the certain code to generates the touch driving signal.

(5) The display device with a touch detection function according to (4), wherein the control device causes a drive electrode that is not selected by the drive electrode scanning unit to be in a floating state in which an electric potential is not fixed.

(6) The display device with a touch detection function according to (2), wherein each of the first scanning signal output circuit and the second scanning signal output circuit comprises a shift register and select a certain number of drive electrode in accordance with transfer of the selection signal.

(7) The display device with a touch detection function according to (2), wherein each of the first scanning signal output circuit and the second scanning signal output circuit comprises a decoder, and thereby determine and output a signal corresponding to a combination of input codes included in the selection signal to select a certain number of drive electrode.

(8) The display device with a touch detection function according to (1), wherein the control device switches between a case in which the drive electrode scanning unit simultaneously selects the drive electrodes of which number is equal to or larger than number of pieces of the power supply wiring and another case in which the drive electrode scanning unit selects the drive electrodes of which number is smaller than the number of pieces of the power supply wiring.

(9) The display device with a touch detection function according to (1), wherein the control device supplies the display driving voltage to the drive electrode from the first power supply wiring, and supplies the touch driving signal to the drive electrode while shifting time from the supply of the display driving voltage.

(10) An electronic apparatus comprising a display device with a touch detection function capable of detecting an external proximity object, the display device with a touch detection function comprises:
a display region in which a plurality of pixel electrodes are arranged in a matrix;
a plurality of drive electrodes arranged opposed to the pixel electrodes;
a display functional layer having an image display function for displaying an image in the display region;
a control device that applies a display driving voltage between the pixel electrodes and the drive electrodes based on an image signal and performs image display control so that the image display function of the display functional layer is exhibited;
a touch detection electrode that is opposed to the drive electrodes and forms capacitance with respect to the drive electrodes;
a touch detection unit that detects a position of a proximity object based on a detection signal from the touch detection electrode;
power supply wiring arranged in a frame region positioned outside the display region; and
a plurality of drive electrode scanning units that select the drive electrode to be coupled to the power supply wiring based on a selection signal from the control device, wherein,
when the drive electrode scanning unit simultaneously selects the drive electrodes of which number is equal to or larger than the number of pieces of the power supply wiring, the control device supplies a touch driving signal that is multiplexed based on a certain code to each of the selected drive electrodes.

The electronic apparatus according to the present disclosure includes the display device with a touch detection function. Examples thereof include, but are not limited to, a television apparatus, a digital camera, a personal computer, a video camera, a portable terminal device such as a cellular telephone, or the like.

With the display device with a touch detection function and the electronic apparatus of the present disclosure, it is possible to reduce connection resistance of a selection switch for selecting a drive electrode to which a driving signal is applied and can narrow the frame.

What is claimed is:

1. A detection device comprising:
   a plurality of drive electrode blocks, each of which includes a plurality of drive electrodes including a first drive electrode, a second drive electrode, and an inside drive electrode provided between the first drive electrode and the second drive electrode;
   a driver that is a circuit coupled to the plurality of drive electrode blocks and configured to:
     switch between a first mode and a second mode;
     drive the plurality of drive electrode blocks in a time division manner in the first mode; and
     drive the plurality of drive electrode blocks in a code-division multiplexed manner in the second mode,
   wherein each of the plurality of drive electrode blocks includes four drive electrodes,
   wherein, in the second mode, the driver applies simultaneously a first drive signal to one of the four drive electrodes of one of the plurality of drive electrode blocks and a second drive signal to the other three drive electrodes of the one of the plurality of drive electrode blocks, and
   wherein the first drive signal and the second drive signal are of opposite polarity.

2. The detection device according to claim 1, wherein, in the second mode, the inside drive electrode and the second drive electrode in a selected one of the plurality of drive electrode blocks are supplied with a second mode drive signal in one period of time, and the first drive electrode and the second drive electrode in the selected one of the plurality of drive electrode blocks are supplied with the second mode drive signal in another period of time.

3. A detection device comprising:
   a plurality of drive electrode blocks, each of which includes a plurality of drive electrodes; and
   a driver coupled to the plurality of drive electrode blocks and configured to switch between a first mode of performing time-division multiplexed driving and a second mode of performing code-division multiplexed driving,
   wherein, in the first mode, the plurality of drive electrodes of one of the plurality of drive electrode blocks are driven one by one,
   wherein, in the second mode, the plurality of drive electrodes of one of the plurality of drive electrode blocks are driven simultaneously using two different drive signals,
   wherein each of the plurality of drive electrode blocks includes four drive electrodes,
   wherein, in the second mode, the driver applies simultaneously a first drive signal to one of the four drive electrodes of one of the plurality of drive electrode blocks and a second drive signal to the other three drive electrodes of the one of the plurality of drive electrode blocks, and
   wherein the first drive signal and the second drive signal are of opposite polarity.

4. The detection device according to claim 3, further comprising
   a controller configured to compare noise of a detection signal from each of the plurality of drive electrodes with a threshold,
   wherein the driver switches a driving mode to the first mode in response to the controller determining that the noise is equal to or less than the threshold by the controller, and
   wherein the driver switches the driving mode to the second mode in response to the controller determining that the noise is greater than the threshold by the controller.

5. The detection device according to claim 3,
   wherein the four drive electrodes include a first electrode, a second electrode, a third electrode, and a fourth electrode, and
   wherein, in the second mode,
     the driver applies the first drive signal to the first electrode and the second drive signal to the second, third, and fourth electrodes in a first period of time,
     the driver applies the first drive signal to the second electrode and the second drive signal to the first, third, and fourth electrodes in a second period of time,
     the driver applies the first drive signal to the third electrode and the second drive signal to the first, second, and fourth electrodes in a third period of time, and
     the driver applies the first drive signal to the fourth electrode and the second drive signal to the first, second, and third electrodes in a fourth period of time.

6. A display device comprising:
   a plurality of drive electrode blocks, each of which includes a plurality of drive electrodes;
   a plurality of pixel electrodes corresponding to the plurality of drive electrodes; and
   a driver coupled to the plurality of drive electrode blocks and configured to switch between a first mode of performing time-division multiplexed driving and a second mode of performing code-division multiplexed driving, and perform display driving in a display period of time,
   wherein, in the first mode, the plurality of drive electrodes of one of the plurality of drive electrode blocks are driven one by one,
   wherein, in the second mode, the plurality of drive electrodes of one of the plurality of drive electrode blocks are driven simultaneously using two different drive signals,
   wherein each of the plurality of drive electrode blocks includes four drive electrodes,
   wherein, in the second mode, the driver applies simultaneously a first drive signal to one of the four drive electrodes of one of the plurality of drive electrode blocks and a second drive signal to the other three drive electrodes of the one of the plurality of drive electrode blocks, and
   wherein the first drive signal and the second drive signal are of opposite polarity.

7. The display device according to claim 6, further comprising
a controller configured to compare noise of a detection signal from each of the plurality of drive electrodes with a threshold,
wherein the driver switches a driving mode to the first mode in response to the controller determining that the noise is equal to or less than the threshold by the controller, and
wherein the driver switches the driving mode to the second mode in response to the controller determining that the noise is greater than the threshold by the controller.

8. The display device according to claim 6,
wherein the four drive electrodes include a first electrode, a second electrode, a third electrode, and a fourth electrode, and
wherein, in the second mode,
the driver applies the first drive signal to the first electrode and the second drive signal to the second, third, and fourth electrodes in a first period of time,
the driver applies the first drive signal to the second electrode and the second drive signal to the first, third, and fourth electrodes in a second period of time,
the driver applies the first drive signal to the third electrode and the second drive signal to the first, second, and fourth electrodes in a third period of time, and
the driver applies the first drive signal to the fourth electrode and the second drive signal to the first, second, and third electrodes in a fourth period of time.

* * * * *